US012611783B2

(12) United States Patent (10) Patent No.: US 12,611,783 B2

Hwang et al. (45) Date of Patent: Apr. 28, 2026

(54) ROBOT HAND AND CONTROL METHOD OF THE SAME

(71) Applicant: SAMSUNG ELECTRONICS CO., LTD., Suwon-si (KR)

(72) Inventors: Cheoggyu Hwang, Suwon-si (KR); Jinho Choi, Suwon-si (KR); Jinwoong Kim, Suwon-si (KR); Jinsoo Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/626,092

(22) Filed: Apr. 3, 2024

(65) Prior Publication Data

US 2024/0269864 A1      Aug. 15, 2024

Related U.S. Application Data

(63) Continuation of application No. PCT/KR2024/001612, filed on Feb. 2, 2024.

(30) Foreign Application Priority Data

Feb. 15, 2023    (KR) ........................ 10-2023-0020281
Mar. 30, 2023    (KR) ........................ 10-2023-0042298

(51) Int. Cl.
  *B25J 15/00*        (2006.01)
  *B25J 9/16*         (2006.01)
  (Continued)

(52) U.S. Cl.
  CPC ......... *B25J 15/0028* (2013.01); *B25J 9/1664* (2013.01); *B25J 9/1697* (2013.01)

(58) Field of Classification Search
  CPC .... B25J 15/0028; B25J 9/1664; B25J 9/1697; B25J 9/1612; B25J 11/008; B25J 15/00;
  (Continued)

(56) References Cited

U.S. PATENT DOCUMENTS 8,388,035 B2 *  3/2013  Kamon ................ B25J 15/0266
                                          294/213
8,757,690 B2 *  6/2014  Gao ..................... B25J 15/0213
                                          294/198
(Continued)

FOREIGN PATENT DOCUMENTS

CN      10138685 C1    4/2003
CN      113829326 A    12/2021
(Continued)

OTHER PUBLICATIONS

J. Zhao, X. Wang, S. Wang, X. Jiang and Y. Liu, "Assembly of randomly placed parts realized by using only one robot arm with a general parallel-jaw gripper," 2020 IEEE International Conference on Robotics and Automation (ICRA), Paris, France, 2020, pp. 5024-5030, doi: 10.1109/ICRA40945.2020.9197396. (Year: 2020).*

(Continued)

*Primary Examiner* — Jaime Figueroa
(74) *Attorney, Agent, or Firm* — Sughrue Mion, PLLC

(57)         ABSTRACT

A robot hand including a first gripper and a second gripper and a method of controlling a robot hand are provided. The method includes: recognizing a shape of an object through a camera; changing, based on the recognized shape of the object, a grasping orientation of the first gripper and the second gripper; grasping the object using the first gripper and the second gripper; and rotating the first gripper and the second gripper to change an orientation of the object according to a target position for the object to be seated.

18 Claims, 26 Drawing Sheets

(51) Int. Cl.
*B25J 11/00* (2006.01)
*B25J 15/02* (2006.01)
(58) Field of Classification Search
CPC .... B25J 15/0004; B25J 15/0038; B25J 15/02;
B25J 15/026; B25J 15/0266
USPC ................. 700/245–264; 318/568.11–568.25
See application file for complete search history.

(56) References Cited

U.S. PATENT DOCUMENTS

| | | | | |
|---|---|---|---|---|
| 9,782,902 | B1 | 10/2017 | Kim et al. | |
| 10,279,484 | B2 * | 5/2019 | Birglen | .................... B25J 15/12 |
| 10,814,476 | B2 | 10/2020 | Yamaguchi et al. | |
| 11,148,295 | B2 | 10/2021 | Correll et al. | |
| 11,325,248 | B2 * | 5/2022 | Shoji | ........................ B25J 9/163 |
| 11,400,582 | B2 * | 8/2022 | Rogers | ................... B25J 17/025 |
| 11,518,045 | B1 * | 12/2022 | Alqasemi | ............. B25J 15/0038 |
| 11,584,022 | B2 * | 2/2023 | Duhamel | ............... B25J 15/022 |
| 11,691,295 | B2 * | 7/2023 | Shinozuka | ........... B25J 15/0425 |
| | | | | 294/86.4 |
| 12,151,375 | B2 * | 11/2024 | Kim | ........................ B25J 15/026 |
| 2010/0256818 | A1 * | 10/2010 | Aoba | ...................... B25J 9/1612 |
| | | | | 700/275 |
| 2016/0229061 | A1 * | 8/2016 | Takizawa | ............... G05B 15/02 |
| 2019/0308320 | A1 * | 10/2019 | Konishi | ................. G06V 20/64 |
| 2019/0344448 | A1 * | 11/2019 | Wicks | .................... B25J 9/0093 |
| 2020/0078935 | A1 * | 3/2020 | Kimura | ....................... B25J 9/10 |
| 2021/0268648 | A1 | 9/2021 | Park | |
| 2021/0321813 | A1 | 10/2021 | Shiraki | |
| 2021/0362960 | A1 * | 11/2021 | Tsunoda | ............... B25J 15/0033 |
| 2022/0126443 | A1 | 4/2022 | Kim et al. | |
| 2023/0046345 | A1 * | 2/2023 | Oka | ........................ B25J 9/1612 |
| 2023/0405841 | A1 * | 12/2023 | Liu | .......................... B25J 15/10 |

FOREIGN PATENT DOCUMENTS

| | | |
|---|---|---|
| DE | 10138685 C1 | 4/2003 |
| JP | 11-262886 A | 9/1999 |
| JP | 5760485 B2 | 8/2015 |
| JP | 5821209 B2 | 11/2015 |
| JP | 2021-121306 A | 8/2021 |
| JP | 2022-110815 A | 7/2022 |
| KR | 10-1862023 B1 | 5/2018 |
| KR | 10-2118843 B1 | 6/2020 |
| KR | 10-2126037 B1 | 6/2020 |
| KR | 10-2022-0053467 A | 4/2022 |

OTHER PUBLICATIONS

Nahum et al; Robotic manipulation of thin objects within off-the-shelf parallel grippers with a vibration finger, 2022, Elsevier, Mechanism and Machine Theory 177 (2022) 105032, https://doi.org/10.1016/j.mechmachtheory.2022.105032, pp. 1-14 (Year: 2022).*
Nie et al; A Hand Combining Two Simple Grippers to Pick up and Arrange Objects for Assembly, 2019, IEEE Robotics and Automation Letters • Jan. 2019; DOI: 10.1109/LRA.2019.2893153; pp. 1-9 (Year: 2019).*
International Search Report (PCT/ISA/210) issued May 8, 2024 by the International Searching Authority in the International Patent Application No. PCT/KR2024/001612.
Written Opinion (PCT/ISA/237) issued May 8, 2024 by the International Searching Authority in the International Patent Application No. PCT/KR2024/001612.
Website, "Franka Hand", Cobofact, Nov. 30, 2022, 2 total pages, https://www.cobofact.ch/shop/franka-hand/.
Kim et al., "Learning Reachable Manifold and Inverse Mapping for a Redundant Robot manipulator", 2021 IEEE International Conference on Robotics and Automation (ICRA), May 2021, 7 total pages, doi:10.1109/ICRA48506.2021.9561589.
Communication dated Jul. 8, 2025, issued by the European Patent Office in European Application No. 24757092.2.
Communication issued Jan. 14, 2026 by the European Patent Office in European Patent Application No. 24757092.2.
Communication issued Jan. 19, 2026 by the European Patent Office in European Patent Application No. 24757092.2.

* cited by examiner

<u>100</u>

1

ROBOT HAND AND CONTROL METHOD OF THE SAME

CROSS-REFERENCE TO RELATED APPLICATIONS

This application is a by-pass continuation of International Application No. PCT/KR2024/001612, filed on Feb. 2, 2024, which is based on and claims priority to Korean Patent Application Nos. 10-2023-0020281, filed on Feb. 15, 2023, and 10-2023-0042298, filed on Mar. 30, 2023, in the Korean Intellectual Property Office, the disclosures of each of which are incorporated by reference herein in their entireties.

BACKGROUND

1. Field

The disclosure relates to a robot hand and a control method of the same.

2. Description of Related Art

A mechanical apparatus performing a movement similar to a motion of a human using electric or magnetic action is referred to as a robot. Early robots performed dangerous work or simple repetitive work, work requiring great strength in place of humans as an industrial robot such as a manipulator or a transfer robot with a purpose of being work automated, unmanned, and the like at a production site, but recently, research and development of humanoid robots that have similar appearance with humans and co-exist with humans in a human work and living space providing various services such as housework are actively being developed.

In the case of humanoid robots described above, a robot hand is included so as to grasp an object in order to smoothly exchange and cooperate with humans in everyday life. The robot hand may realize a precise work and a flexible and safe work similar to a hand of a human.

SUMMARY

According to an aspect of the disclosure, a method of controlling a robot hand including a first gripper and a second gripper, includes: recognizing a shape of an object through a camera; changing, based on the recognized shape of the object, a grasping orientation of the first gripper and the second gripper; grasping the object using the first gripper and the second gripper; and rotating the first gripper and the second gripper to change an orientation of the object according to a target position for the object to be seated.

The grasping the object may include: grasping the object in a first grasping orientation by moving the first gripper and the second gripper from closer together from a spaced apart state, or grasping the object in a second grasping orientation by rotating the first gripper and the second gripper in opposite directions from one another while the first gripper and the second gripper are in a contacted state.

The first grasping orientation may include the first gripper and the second gripper being arranged in parallel.

The changing the grasping orientation may further include arranging the first gripper and the second gripper into a first grasping orientation or a second grasping orientation, the arranging the first gripper and the second gripper into the first grasping orientation may include causing the first gripper and the second gripper to be in parallel with one another, and causing a first grasping part of the first gripper and a second grasping part of the second gripper to face one another, and the arranging the first gripper and the second gripper into the second grasping orientation may include causing the first gripper and the second gripper to be in parallel with one another, and causing the first grasping part and the second grasping part to be oriented in opposite directions.

The grasping orientation may further include arranging the first gripper and the second gripper into the first grasping orientation, the second grasping orientation, or a third grasping orientation, and the arranging the first gripper and the second gripper into the third grasping orientation may include causing the first gripper and the second gripper to move toward one another until the first grasping part comes into contact with the second grasping part, and rotating the first grasping part and the second grasping part using a scissoring motion.

The grasping the object may include the first gripper and the second gripper being moved in parallel with each other toward the object.

The rotating the first gripper and the second gripper to change the orientation of the object may include: identifying rotation angles of the first gripper and the second gripper according to the target position to seat the object; and rotating the first gripper and the second gripper in a same direction at the identified rotation angles.

According to an aspect of the disclosures, a robot hand includes: a supporting part; a first linking part and a second linking part expandably connected, respectively, at opposite sides of the supporting part; a first finger part including a first back end which is connected to the first linking part; a second finger part including a second back end which is connected to the second linking part, wherein the second finger part is parallel to the first finger part; a first gripper rotatably connected to a first front end of the first linking part; a second gripper rotatably connected to a second front end of the second linking part and facing the first gripper; a first driver configured to expandably drive the first linking part and the second linking part; a second driver configured to drive the first gripper to rotate; and a third driver configured to drive the second gripper to rotate.

The first finger part and the second finger part may be configured to remain parallel while moving closer to one another in a first direction and moving apart from one another in a second direction.

The robot hand may further include a locking part configured to lock the first finger part and the second finger part while the first gripper and the second gripper are in a contacted state.

The locking part may include: an operation button provided at the first finger part and facing the second finger part; a locking pin configured to protrude from the first gripper based on the operation button being pressed; a groove member provided at the second finger part and configured to receive the locking pin; and a hydraulic line disposed between the operation button and the locking pin.

The first gripper may include: a first grasping part; a second grasping part extended from the first grasping part; and a third grasping part provided between the first grasping part and the second grasping part, and the second gripper may include: a fourth grasping part facing the first gripper and configured to grasp an object together with the first grasping part; a fifth grasping part extended from the fourth grasping part and configured to grasp an object together with the second grasping part; and a sixth grasping part provided between the fourth grasping part and the fifth grasping part and configured to grasp an object together with the third grasping part.

The second grasping part and the fourth grasping part may be configured to face each other when to the first gripper and the second gripper are in a contacted state and are rotated in opposite directions from each other.

The robot hand may further include a synchronizer configured to maintain the first finger part and the second finger part in parallel by linking an expansion driving of the first linking part and the second linking part.

The synchronizer may include: a first gear chain connecting the first linking part and the first finger part at a 1:2 deceleration ratio; and a second gear chain connecting the second linking part and the second finger part at a 1:2 deceleration ratio.

According to an aspect of the disclosure, a service robot includes: a base; a stand connected to and disposed vertically to the base; a first arm connected to the stand; a second arm rotatably connected to the first arm; a robot hand connected to the second arm and including a first gripper and a second gripper; and at least one processor configured to: recognize a shape of an object based on an image of the object, and control the robot hand to grasp the object by changing a grasping orientation of the first gripper and the second gripper according to a recognition result.

The robot hand is inclined toward an outer side of the second arm with respect to a straight line which is perpendicular to a horizontal direction of the second arm, and the robot hand may further include: a supporting part; a first linking part and a second linking part expandably connected, respectively, at opposite sides of the supporting part; a first finger part including a first back end which is connected to the first linking part; a second finger part including a second back end which is connected to the second linking part, wherein the second finger part is parallel to the first finger part; a first driver configured to expandably drive the first linking part and the second linking part; a second driver configured to drive the first gripper to rotate; and a third driver configured to drive the second gripper to rotate, the first gripper is rotatably connected to a first front end of the first linking part, and the second gripper is rotatably connected to a second front end of the second linking part and faces the first gripper.

The robot hand may further include a locking part configured to lock the first finger part and the second finger part while the first gripper and the second gripper are in a contacted state.

The locking part may include: an operation button provided at the first finger part and facing the second finger part; a locking pin configured protrude from the first gripper based on the operation button being pressed; a groove member provided at the second finger part and configured to receive the locking pin; and a hydraulic line disposed between the operation button and the locking pin.

The first gripper may include: a first grasping part; a second grasping part extended from the first grasping part; and a third grasping part provided between the first grasping part and the second grasping part, and the second gripper may include: a fourth grasping part facing the first gripper and configured to grasp an object together with the first grasping part; a fifth grasping part extended from the fourth grasping part and configured to grasp an object together with the second grasping part; and a sixth grasping part provided between the fourth grasping part and the fifth grasping part and configured to grasp an object together with the third grasping part.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
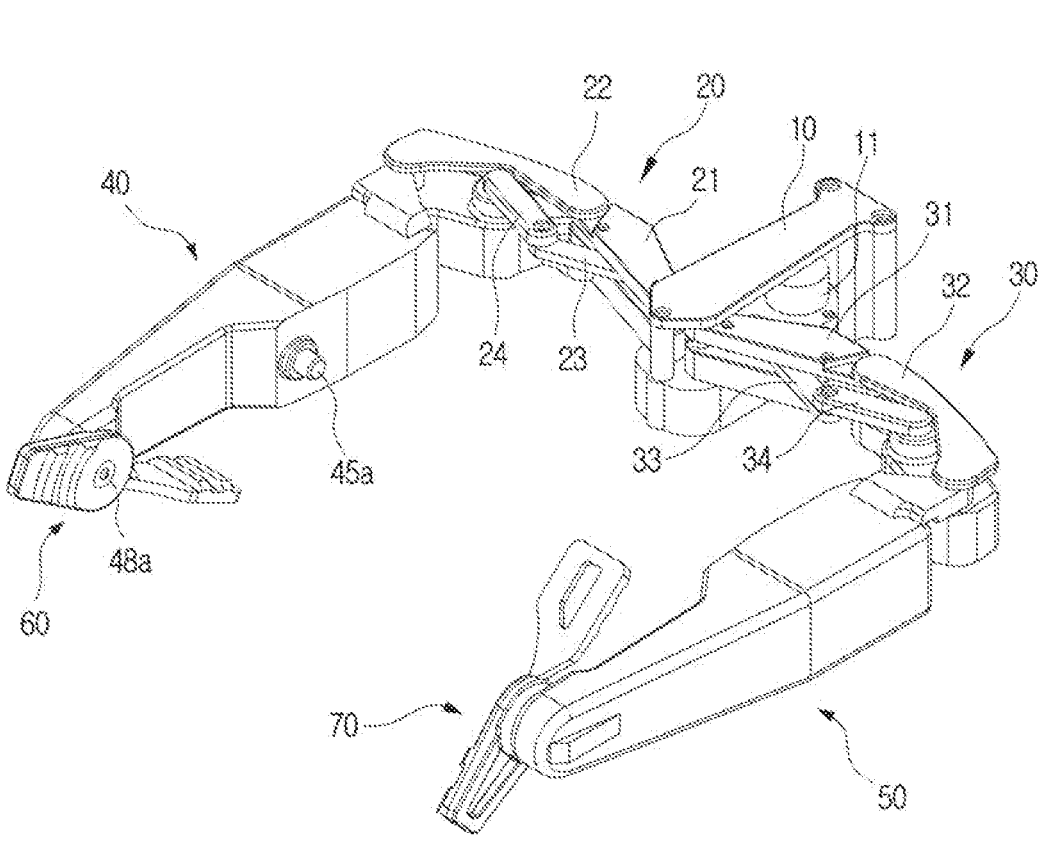
FIG. 1 is a perspective diagram illustrating a robot hand according to one or more embodiments.

One or more embodiments described in the disclosure and configurations shown in the drawings are merely preferable examples of the disclosure described, and various modified examples that can substitute the one or more embodiments and the drawings may be available at the time the disclosure was filed.

In addition, like reference numerals or symbols shown in each drawing of the disclosure represent a component or element that performs a substantially same function.

In addition, terms used in the disclosure have been used to described one or more embodiments, is not intended to limit the disclosure described. A singular expression includes a plural expression, unless otherwise specified. It is to be understood that the terms such as "have" or "include" are used herein to designate a presence of a characteristic, a number, a step, a motion, an element, a component, or a combination thereof, and not to preclude a presence or a possibility of adding one or more of other characteristics, numbers, steps, motions, elements, components or a combination thereof.

In addition, terms including ordinal numbers such as "first" and "second" used herein may be used in describing various elements, but the elements are not limited by the above-described terms, and the terms may be used only for the purpose of distinguishing one element from another element. For example, a first element may be denoted as a second element, and similarly a second element may also be denoted as a first element without departing from the scope of the disclosure. The term "and/or" includes a combination of a plurality of items described in association or any item from among the plurality of items described in association. Herein, the expression "at least one of a, b or c" indicates "only a," "only b," "only c," "both a and b," "both a and c," "both b and c," or "all of a, b, and c."

Terms such as a "front end", a "back end", an "upper part", a "lower part", a "front surface", a "back surface", an "upper end", and a "lower end" used in the description below are defined based on the drawings, and shapes and positions of each element are not limited by the terms.

Hereafter, certain embodiments according to the disclosure will be described in detail below with reference to the accompanied drawings.

Figure 2:
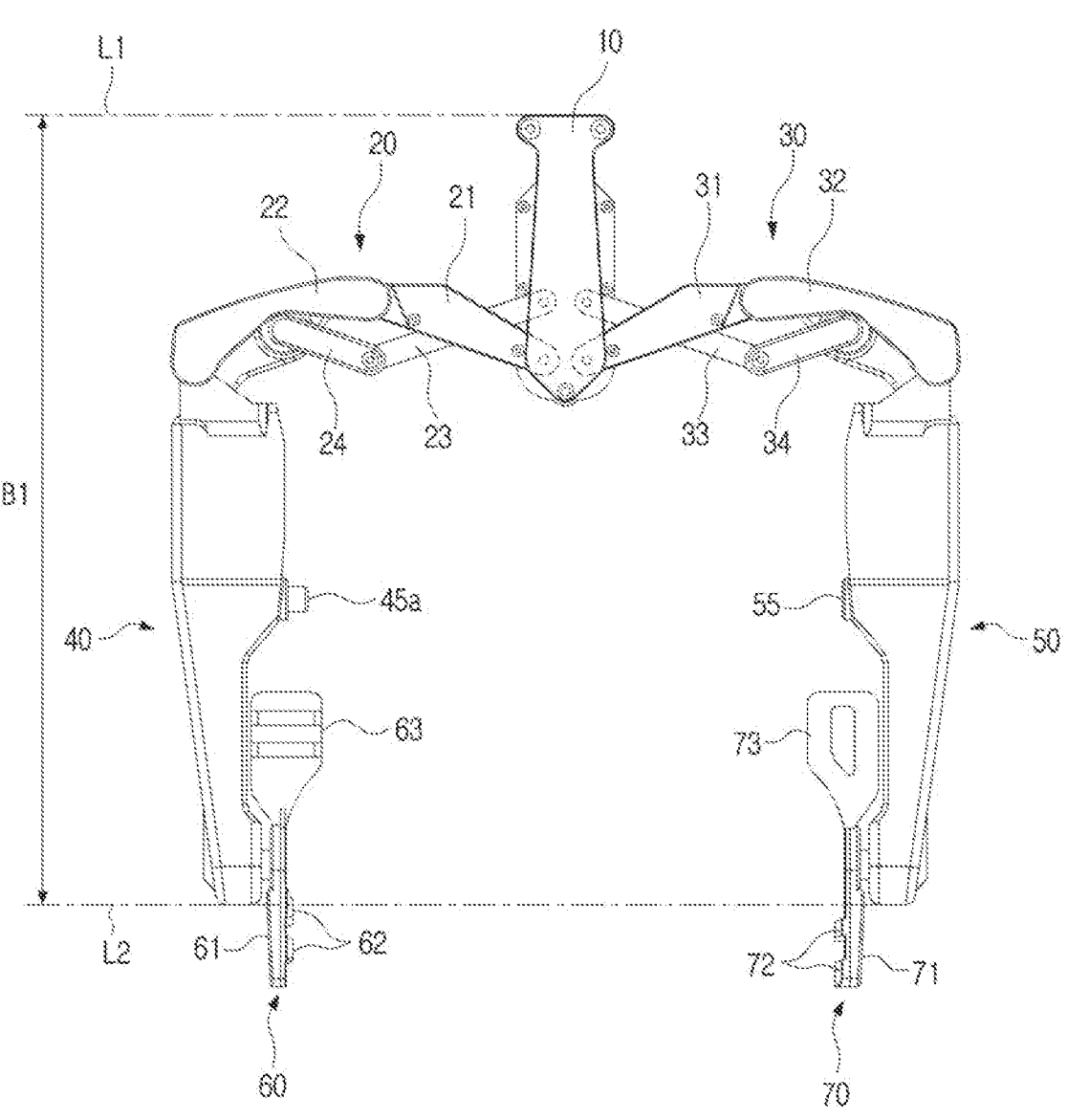
FIG. 2 is a diagram illustrating a first finger part and a second finger part of a robot hand spread at a maximum spacing according to one or more embodiments.
Figure 3:
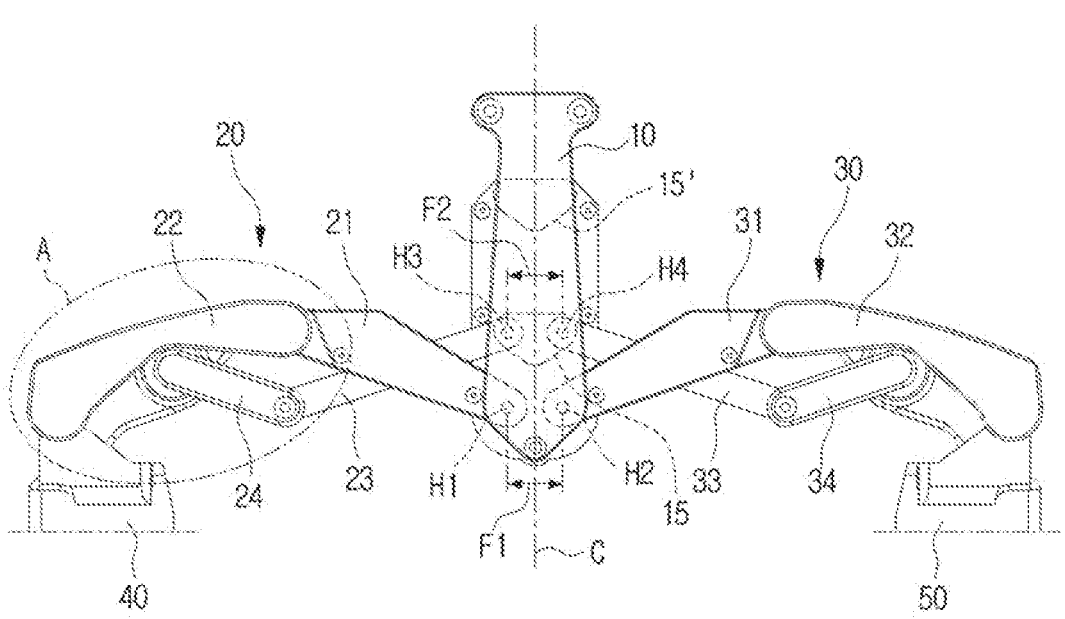
FIG. 3 is a diagram illustrating a schematic structure of a first linking part and a second finger part connected to a supporting part of a robot hand according to one or more embodiments.
Figure 4:
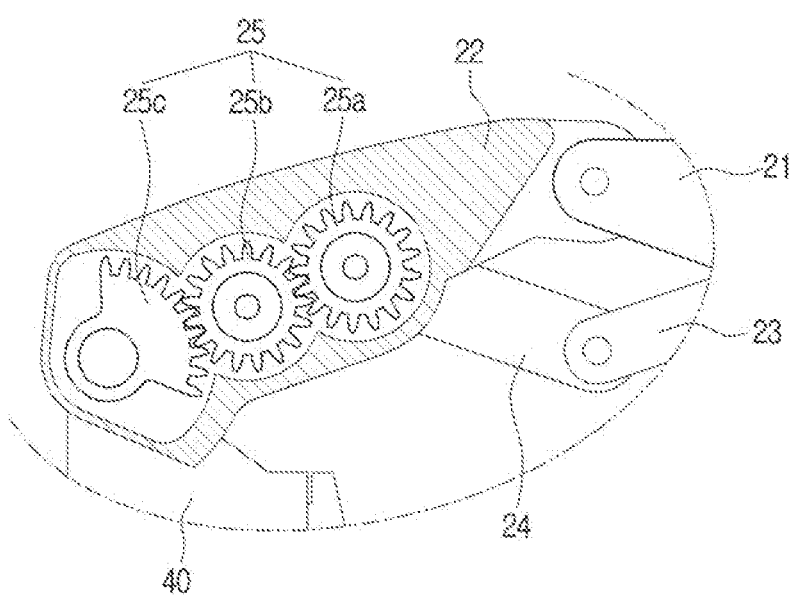
FIG. 4 is a diagram illustrating an interior of part A shown in FIG. 3.

FIG. 1 is a perspective diagram illustrating a robot hand according to one or more embodiments. FIG. 2 is a diagram illustrating a first finger part and a second finger part of a robot hand spread at a maximum spacing according to one or more embodiments. FIG. 3 is a diagram illustrating a structure of a first linking part and a second finger part connected to a supporting part of a robot hand according to one or more embodiments. FIG. 4 is a diagram illustrating an interior of part A shown in FIG. 3. In the disclosure, a robot hand may refer to a mechanical equipment with a structure capable of grasping an object, a finger part may refer to a mechanical component having a predetermined length and includes a driving apparatus inside thereof, a linking part may refer to a mechanical component which connects the finger part to a supporting part of the robot hand, and a gripper may refer to a mechanical component that directly grasps an object.

Referring to FIG. 1 and FIG. 2, a robot hand 1 according to one or more embodiments may recognize a shape of an object and an orientation of an object, and select a grasping orientation suitable for grasping an object from among various grasping orientations based on the recognized result. The robot hand 1 may grasp the object with the selected grasping orientation and safely transport to a pre-set position.

The robot hand 1 may include a supporting part 10, a first linking part 20 and a second linking part 30 connected respectively at both sides of the supporting part 10, a first finger part 40 connected to the first linking part 20, a second finger part 50 connected to the second linking part 30, a first gripper 60 connected to the first finger part 40, and a second gripper 70 connected to the second finger part 50.

The supporting part 10 may be a medium to which the robot hand 1 may be mounted to a robot arm. The supporting part 10 may be electrically connected with the robot arm when mounted to the robot arm. The supporting part 10 may receive power from a power supplying device through the robot arm, and apply the above to a plurality of motors (e.g., a first driving motor 11 (i.e., first driver) in FIG. 1, a second driving motor 41 (i.e., second driver) in FIG. 5A, and a third driving motor 51 (i.e., third driver) in FIG. 5B) provided in the robot hand 1.

The supporting part 10 may be disposed with the first driving motor 11 for driving the first linking part 20 and the second linking part 30. The first driving motor 11 may be a stepping motor or a direct current (DC) servomotor capable of forward rotation driving and reverse rotation driving. When the first driving motor 11 is driven in a forward rotation, a length of the first linking part 20 and a length of the second linking part 30 may be respectively extended. When the first driving motor 11 is driven in a reverse rotation, the length of the first linking part 20 and the length of the second linking part 30 may be respectively reduced.

Based on the length of the first linking part 20 and the length of the second linking part 30 being extended or reduced, the first finger part 40 connected to the first linking part 20 and the second finger part 50 connected to the second linking part 30 may be configured such that a spacing between each other becomes wider or narrower. The robot hand 1 may perform a motion of grasping an object or a motion of releasing the grasping of the object by varying the spacing of the first finger part 40 and the second finger part 50.

At one end of the supporting part 10, a coupling part 13 which is mounted to the robot arm may be provided. At the robot arm, a mounting part to which the coupling part 13 of the supporting part 10 may be mounted to be separable may be provided. The coupling part 13 of the supporting part 10 and the coupling part of the robot arm may be electrically connected through a pogo pin connector method. For example, the robot hand 1 may be mounted to a tool magazine provided in the robot. The robot hand 1 may be configured such that the coupling part 13 of the supporting part 10 is coupled to the mounting part of the robot arm by a tool exchange motion of the robot arm. The robot hand 1 may be separated from the tool magazine after being mounted to the robot arm.

The first linking part 20 and the second linking part 30 may include a scissors-type link structure with which the lengths thereof may be varied. The scissors-type link structure may be a structure in which members that are consecutively hinge connected are rotated in opposite directions and an entire length of the structure is reduced or extended. The first linking part 20 and the second linking part 30 may receive driving force from the first driving motor 11 and the length may be simultaneously extended or reduced. The first linking part 20 and the second linking part 30 disposed respectively at a left side and a right side of the supporting part may move in a direction that becomes farther apart from each other when the lengths are extended, and move in a direction that becomes close to each other when the lengths are reduced. As described above, as the first linking part 20 and the second linking part 30 include the scissors-type link structure, when the spacing of the first finger part 40 and the second finger part 50 is narrowed, the lengths of the first linking part 20 and the second linking part 30 are reduced and thereby, the robot hand 1 may approach a narrow space without interference from surrounding structures.

In this case, the first finger part 40 and the second finger part 50 may move in parallel without displacement occurring in a forward direction or a reverse direction when moving in a direction of becoming farther apart from each other or in a direction of becoming closer to each other. Accordingly, control for a motion in a direction in which the first finger part 40 and the second finger part 50 become farther apart or closer to each other may be simplified. Here, the forward direction may be a direction of moving along a length direction of the first linking part 20 and the second linking part 30.

Referring to FIG. 3, the first linking part 20 may include a plurality of links. For example, the first linking part 20 may include a first link 21, a second link 22, a third link 23, and a fourth link 24.

One end of the first link 21 may be hinge connected at a left side of the supporting part 10. An opposite end of the first link 21 may be rotatably connected to one end of the second link 22. An opposite end of the second link 22 may be rotatably connected to a back end of the first finger part 40. Accordingly, the first link 21 and the second link 22 may connect the left side of the supporting part 10 and the back end of the first finger part 40.

One end of the third link 23 may be slidably connected to the supporting part 10. For example, in the supporting part 10, a sliding block 15 disposed to be slidable along a length direction of the supporting part 10 may be included. The one end of the third link 23 may be hinge connected to a left side of the sliding block 15. An opposite end of the third link 23 may be hinge connected to one end of the fourth link 24. The third link 23 may be disposed to intersect with the first link 21. An opposite end of the fourth link 24 may be hinge connected to the second link 22. In FIG. 3, reference numeral 15' shows the sliding block when moved toward a back end of the supporting part 10. Accordingly, reference numerals 15 and 15' indicate the same sliding block.

The second linking part 30 may be symmetrically disposed with the first linking part 20 based on a center line C. The second linking part 30 may include a plurality of links.

For example, the second linking part 30 may include a fifth link 31, a sixth link 32, a seventh link 33, and an eighth link 34.

A length of the fifth link 31 may be substantially the same as the length of the first link 21. One end of the fifth link 31 may be hinge connected to a right side of the supporting part 10. An opposite end of the fifth link 31 may be rotatably connected to one end of the sixth link 32.

A length of the sixth link 32 may be substantially the same as the length of the second link 22. An opposite end of the sixth link 32 may be rotatably connected to a back end of the second finger part 50. Accordingly, the fifth link 31 and the sixth link 32 may connect the right side of the supporting part 10 and the back end of the first finger part 40.

A length of the seventh link 33 may be substantially the same as the length of the third link 23. One end of the seventh link 33 may be slidably connected to the supporting part 10. For example, the one end of the seventh link 33 may be hinge connected to a right side of the sliding block 15. An opposite end of the seventh link 33 may be hinge connected to one end of the eighth link 34. The seventh link 33 may be disposed to intersect with the fifth link 31. An opposite end of the eighth link 34 may be hinge connected to the sixth link 32.

A spacing F1 between a hinge axis H1 of the first link 21 and a hinge axis H2 of the fifth link 31 may be substantially the same as a spacing F2 between a hinge axis H3 of the third link 23 and a hinge axis H4 of the seventh link 33. In addition, the hinge axis H1 of the first link 21 and the hinge axis H3 of the third link 23 may be disposed on a virtual first straight line parallel to the center line C of the supporting part 10. The hinge axis H2 of the fifth link 31 and the hinge axis H4 of the seventh link 33 may be disposed on a virtual second straight line parallel to the center line C of the supporting part 10. Positions of the above-described hinge axes H1, H2, H3, and H4 may be one from among conditions for moving the first finger part 40 and the second finger part 50 in parallel.

Another one from among the conditions for moving the first finger part 40 and the second finger part 50 in parallel may be a structure of the fourth link 24 controlling a rotation of the first finger part 40 through a first gear chain 25 and the eighth link 34 controlling a rotation of the second finger part 50 through a second gear chain (the second gear train may be essentially the same as the first gear train) when the lengths of the first linking part 20 and the second linking part 30 are varied. The first gear chain and the second gear chain together act as a synchronizer for movement of the first finger part 40 and second finger part 50.

An example of the first gear chain 25 connecting the second link 22 with the fourth link 24 will be described with reference to FIG. 4. The fourth link 24 may be gear connected with the first finger part 40 through the first gear chain 25. The first gear chain 25 may be provided at the second link 22.

The first gear chain 25 may include a plurality of gears. For example, the first gear chain 25 may include a first gear 25a, a second gear 25b, and a third gear 25c. The first gear 25a may be connected at an opposite end of the fourth link 24 and configured to rotate together with the fourth link 24. The second gear 25b may be disposed between the first gear 25a and the third gear 25c and configured to transfer rotational force of the first gear 25a to the third gear 25c. The third gear 25c may be connected to the back end of the first finger part 40 and configured to rotate together with the first finger part 40.

The first gear 25a and the second gear 25b may have a gear ratio that is substantially the same. The third gear 25c may have a greater gear ratio than the first gear 25a. For example, a gear ratio of the first gear 25a, the second gear 25b, and the third gear 25c may be 1:1:2, but is not limited thereto, and may be changed variously according to design. Accordingly, when varying the length of the first linking part 20, a rotation direction of the first finger part 40 may be an opposite direction from a rotation direction of the second link 22. In this case, a rotation angle of the first finger part 40 may be 0.5 times of a rotation angle of the second link 22.

The first finger part 40 may be moved in parallel by the first gear chain 25 when the length of the first linking part 20 is varied. When the length of the first linking part 20 is in a maximally extended state (referring to FIG. 2), the length may be a first distance B1 from the back end of the supporting part 10 to a front end of the first finger part 40. When the length of the first linking part 20 is in a maximally reduced state (referring to FIG. 5), a second distance B2 from the back end of the supporting part 10 to the front end of the first finger part 40 may be substantially the same as the first distance B1. Accordingly, the first finger part 40 may move in parallel when the length of the first linking part 20 is varied, but not move in the front direction or back direction of the first finger part 40. Accordingly, the first finger part 40 may simplify the control of the robot hand 1 because no displacement to the front direction or the back direction of the first finger part 40 occurs when the length of the first linking part 20 is varied.

The second finger part 50 may receive rotational force from the eighth link 34 by the second gear chain. The second gear chain may include a fourth gear, a fifth gear, and a sixth gear the same as or similarly with the first gear chain 25. For example, the second gear chain may include a fourth gear connected at an opposite end of the eighth link 34 and configured to rotate with the eighth link 34, the fifth gear disposed between the fourth gear and the sixth gear and configured to transfer rotational force of the fourth gear to the sixth gear, and the sixth gear connected at the back end of the second finger part 50 and configured to rotate together with the second finger part 50. A gear ratio of the fourth gear, the fifth gear, and the sixth gear may be 1:1:2.

The second linking part 30 may receive driving force of the first driving motor 11 and the length may be varied. The second finger part 50 may move in parallel in an opposite direction from the moving direction of the first finger part 40.

Figure 5A:
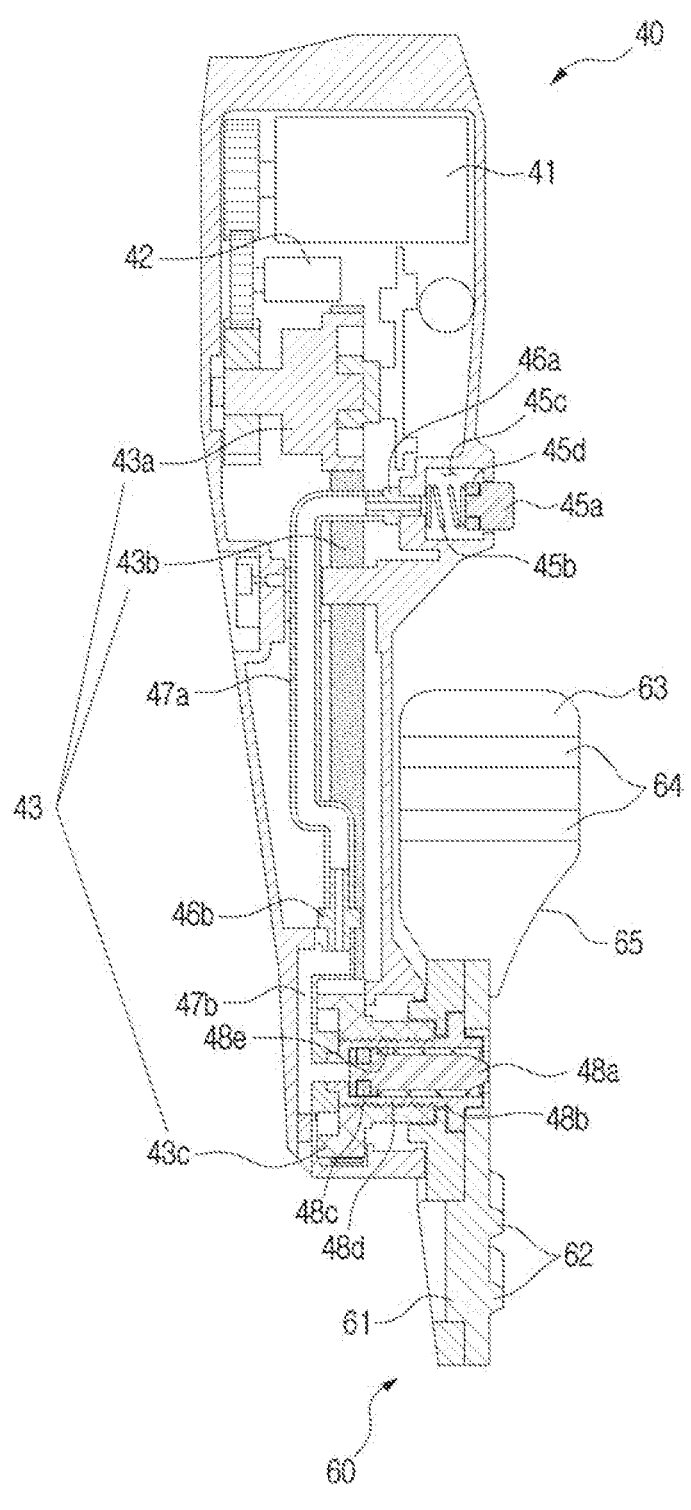
FIG. 5A is a diagram illustrating a schematic of an interior structure of a first finger part of a robot hand according to one or more embodiments.
Figure 5B:
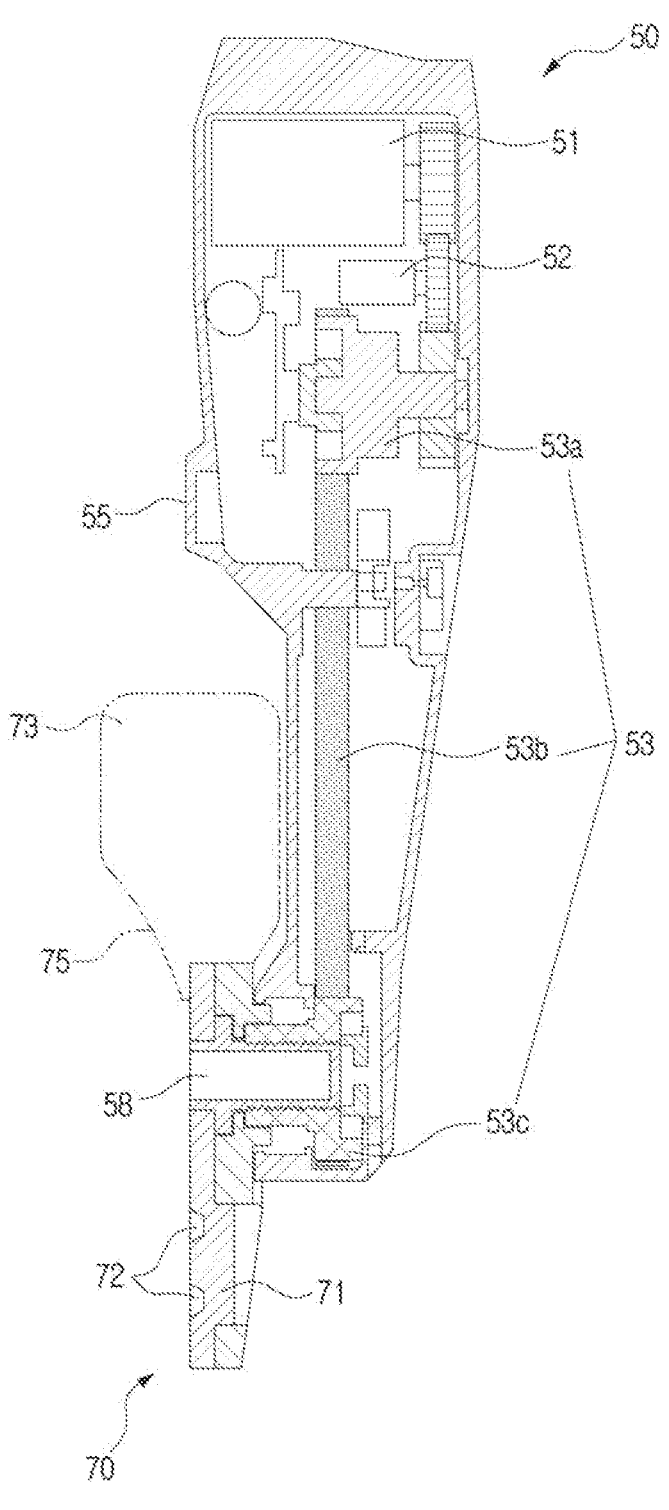
FIG. 5B is a diagram illustrating a schematic of an interior structure of a second finger part of a robot hand according to one or more embodiments.
Figure 6:
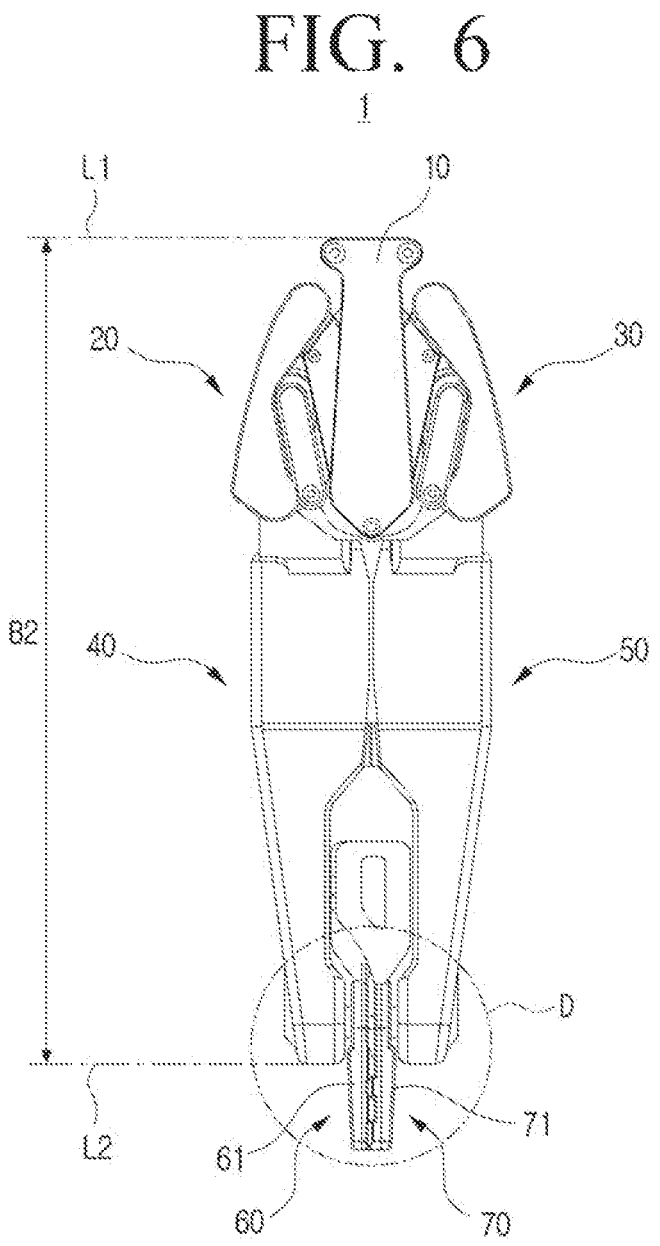
FIG. 6 is a diagram illustrating a first finger part and a second finger part of a robot hand contacting each other according to one or more embodiments.
Figure 7:
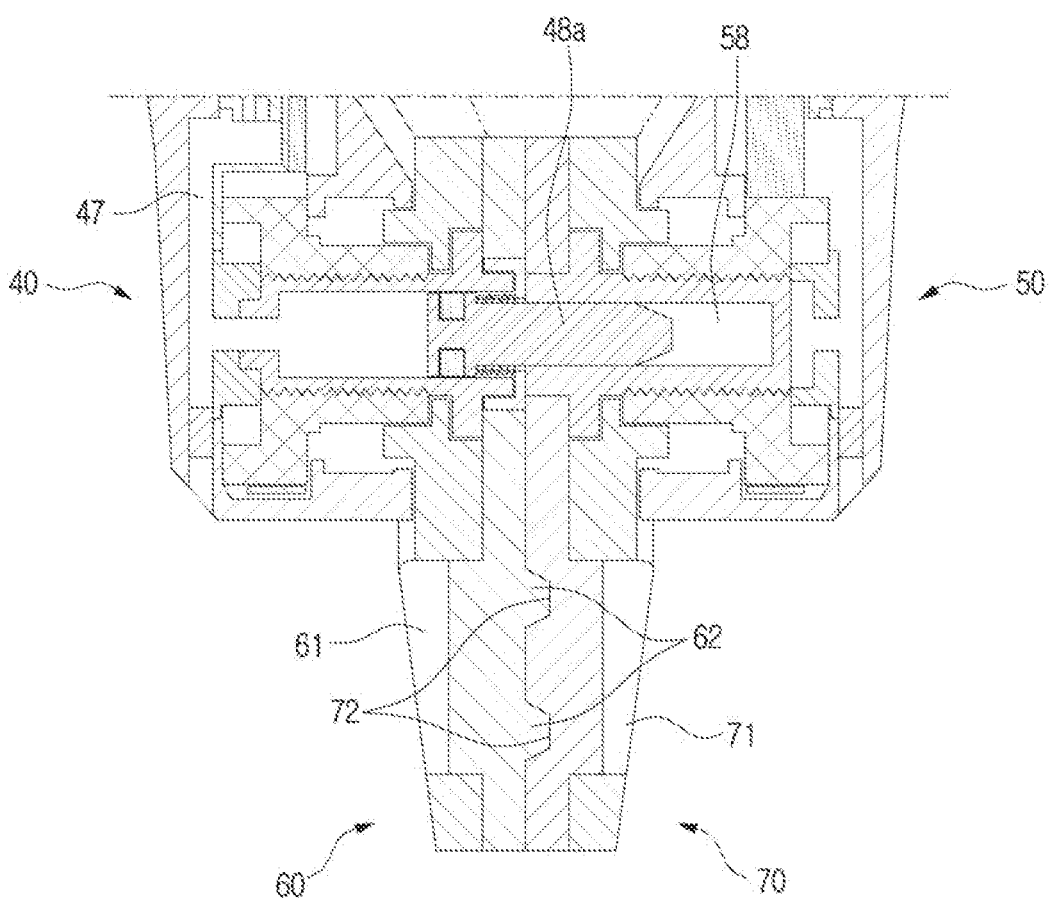
FIG. 7 is a diagram illustrating an interior of part D shown in FIG. 6.

FIG. 5A is a diagram illustrating a schematic interior structure of a first finger part of a robot hand according to one or more embodiments. FIG. 5B is a diagram illustrating a schematic interior structure of a second finger part of a robot hand according to one or more embodiments. FIG. 6 is a diagram illustrating a first finger part and a second finger part of a robot hand contacting each other according to one or more embodiments. FIG. 7 is a diagram illustrating an interior of part D shown in FIG. 6.

Referring to FIG. 5A, the first finger part 40 may be configured such that the first gripper 60 is rotatably disposed at a right side of the front end thereof. In the first finger part 40, a second driving motor 41, a first decelerator 42, and a first power transferring part 43 may be disposed to drive the first gripper 60 to forward rotate and reverse rotate.

The second driving motor 41 may be connected with the first decelerator 42 to obtain a high rotation output torque by reducing an output number of rotations of the second driving motor 41. The first power transferring part 43 may transfer a forward rotation driving force and a reverse rotation driving force transferred from the first decelerator 42 to the first gripper 60. The first power transferring part 43 may include a first pulley 43a connected with the first decelerator 42, a second pulley 43c connected with the first gripper 60, and a first driving belt 43b configured to connect the first pulley 43a and the second pulley 43c with each other.

The robot hand 1 may include an end effector at front end parts of the first finger part 40 and the second finger part 50 so as to grasp objects of various shapes with a simple structure. The end effector may refer to a structure for performing a random motion such as grasping or rotating an object from a tip end of the robot hand. The end effector may include a first gripper 60 provided at a front end part of the first finger part 40 and a second gripper 70 provided at a front end part of the second finger part 50. The first gripper 60 and the second gripper 70 may apply a degree of freedom to the front end parts of the first finger part 40 and the second finger part 50.

The robot hand 1 may grasp an object of roughly a plate shape such as a dish in a scissoring motion through the first gripper 60 and the second gripper 70. Here, the grasping with the scissoring motion may be grasping an object as a part of the first gripper 60 and a part of the second gripper 70 rotates in a direction facing each other.

In order for the first gripper 60 and the second gripper 70 to stably grasp an object with the scissoring motion, the first finger part 40 and the second finger part 50 may maintain a locked state with each other. To this end, in the first finger part 40, a locking pin 48a as shown in FIG. 5A may be provided, and the second finger part 50 may be provided with a groove member 58 to which the locking pin 48a is inserted.

An operation button 45a may be elastically supported by a first elastic member 45b and protruded to an outside of the first finger part 40. The operation button 45a may be pressed by a pressing part 55 of the second finger part 50 that faces with the operation button 45a when the first finger part 40 and the second finger part 50 are in contact after moving in a direction of becoming closer with each other according to the driving of the first linking part 20 and the second linking part 30.

The locking pin 48a may be pressed by elastic force of a second elastic member 48b and positioned inside of a guide member 48d. The locking pin 48a may be configured such that a part thereof is protruded from the guide member 48d by hydraulic pressure when the operation button 45a is pressed by the pressing part 55 of the second finger part 50. The groove member 58 may be inserted with a part of the locking pin 48a protruded from the guide member 48d.

In the first finger part 40, a hydraulic pressure structure of protruding the locking pin 48a from the guide member 48d based on the operation button 45a being pressed by the pressing part 55 of the second finger part 50 may be included. The hydraulic pressure structure may include a first hydraulic line 47a and a second hydraulic line 47b connected to the first hydraulic line. The first hydraulic line 47a may be formed of a pipe having a predetermined length. One end of the first hydraulic line 47a may be connected to a first chamber 45d disposed with the operation button 45a through a first fit 46a. An opposite end of the first hydraulic line 47a may be connected to one end of the second hydraulic line 47b through a second fit 46b. An opposite end of the second hydraulic line 47b may be connected with a second chamber 48e disposed at an inside of the guide member 48d. Accordingly, the first chamber 45d, the first hydraulic line 47a, the second hydraulic line 47b, and the second chamber 48e may be connected in series. In the first chamber 45d, the first hydraulic line 47a, the second hydraulic line 47b, and the second chamber 48e, an operating oil may be filled.

At the operation button 45a, a first sealing member 45c configured to prevent operating oil from being leaked from the first chamber 45d may be coupled. At the locking pin 48a, a second sealing member 48c configured to prevent operating oil from being leaked from the second chamber 48e may be coupled.

The second finger part 50 may include a driving structure same as or similar with a driving structure of the first finger part 40 to drive the second gripper 70 to forward rotate or reverse rotate. For example, at the second finger part 50, a third driving motor 51, a second decelerator 52, and a second power transferring part 53 may be disposed.

Rotational force generated from the third driving motor 51 may be transferred to the second gripper 70 through the second decelerator 52 and the second power transferring part 53. The second power transferring part 53 may include a third pulley 53a connected with the second decelerator 52, a fourth pulley 53c connected with the second gripper 70, and a second driving belt 53b configured to connect the third pulley 53a and the fourth pulley 53c with each other.

Referring to FIG. 6 and FIG. 7, when the operation button 45a is pressed by the pressing part 55 of the second finger part 50 as the first finger part 40 and the second finger part 50 move in a direction of becoming closer with each other, the operating oil of the first chamber 45d, the first hydraulic line 47a, the second hydraulic line 47b, and the second chamber 48e may be compressed toward the side of the locking pin 48a. The hydraulic pressure operating at the locking pin 48a may push the locking pin 48a which is elastically supported by the second elastic member 48b to an outer side of the first finger part 40. The locking pin 48a may be configured such that one part thereof is protruded to the outer side of the guide member 48d by the hydraulic pressure and inserted in the groove member 58 that faces with the locking pin 48a.

In this case, because the first gripper 60 and the second gripper 70 are in a fixed state with each other, the robot hand 1 may be configured to stably grasp an object with the scissoring motion using the first gripper 60 and the second gripper 70.

The first gripper 60 may select one from among various grasping orientations for grasping an object according to driving of the second driving motor 41 to forward rotate or reverse rotate. In addition, the second gripper 70 may select one from among the various grasping orientations for grasping an object according to driving of the third driving motor 51 to forward rotate or reverse rotate.

Referring to FIG. 5A, the first gripper 60 may include several grasping parts capable of grasping an object according to the shape of the object. For example, the first gripper 60 may include a first grasping part 61, a second grasping part 63 extended from the first grasping part 61, and a third grasping part 65 provided at one side of the second grasping part 63.

The first grasping part 61 may be disposed to face a side of the second gripper 70. The first grasping part 61 may be coupled with the second pulley 43c, and the guide member 48d may pass therethrough. The first grasping part 61 may be provided with a plurality of first non-slip protrusions 62 to increase friction force with an object when grasping the object.

The second grasping part 63 may be configured such that the first grasping part 61 is extended from one end along a length direction of the first gripper 60. The second grasping part 63 may be formed so as to face a different direction from the first grasping part 61. For example, the second grasping part 63 may be configured to face an approximate perpendicular direction to a direction that the first grasping part 61 is facing as shown in FIG. 5A. The second grasping part 63 may be provided with a plurality of second non-slip protrusions 64.

The third grasping part 65 may be provided at an end part adjacent to the second gripper 70 from among an outer part of the second grasping part 63. The third grasping part 65 may have a gentle curvature.

Referring to FIG. 5B, the second gripper 70 may have a similar structure with the first gripper 60. For example, the second gripper 70 may include a fourth grasping part 71, a fifth grasping part 73 extended at the fourth grasping part 71, and a sixth grasping part 75 provided at one side of the fifth grasping part 73.

The fourth grasping part 71 may be disposed to face a side of the first gripper 60. The fourth grasping part 71 may be coupled with the fourth pulley 53c, and the groove member 58 may pass therethrough. The fourth grasping part 71 may be provided with a plurality of grooves 72 to increase friction force with an object when grasping the object.

The plurality of grooves 72 may be formed in an arc shape having a curvature that is substantially the same as with a first non-slip protrusion 62 for the first non-slip protrusion 62 of the first grasping part 61 to be inserted. If the first gripper 60 and the second gripper 70 assume an orientation for grasping an object with the scissoring motion, the first grasping part 61 and the fourth grasping part 71 may contact each other. At this time, the plurality of first non-slip protrusions 62 may be inserted in the plurality of grooves 72. The plurality of first non-slip protrusions 62 may be configured such that the first gripper 60 and the second gripper 70 rotate in opposite directions from each other based on the locking pin 48a according to the plurality of grooves 72 having a same curvature with one another.

The fifth grasping part 73 may be configured such that the fourth grasping part 71 is extended from one end thereof along a length direction of the second gripper 70. The fifth grasping part 73 may be configured to face an approximate perpendicular direction to a direction that the fourth grasping part 71 is facing as shown in FIG. 5B. In addition, the fifth grasping part 73 may be configured to face an opposite direction of the direction that the second grasping part 63 is facing. Accordingly, when first gripper 60 and the second gripper 70 select an orientation for the scissoring motion, the fifth grasping part 73 may be configured to face with the second grasping part 63. The fifth grasping part 73 may be provided with a plurality of second non-slip protrusions 64.

The sixth grasping part 75 may be provided at an end part adjacent to the first gripper 60 from among an outer part of the fifth grasping part 73. The sixth grasping part 75 may have a gentle curvature. The sixth grasping part 75 may be configured to stably grasp an object of a curved surface shape such as a cup together with the third grasping part 65.

The first gripper 60 and the second gripper 70 may be configured to stably grasp an object of various shapes through the first, second, and third grasping parts 61, 63, and 65 of the first gripper 60 and the fourth, fifth, and sixth grasping parts 71, 73, and 75 of the second gripper 70. The first gripper 60 and the second gripper 70 may select various grasping orientations for grasping an object together therewith. The grasping orientation of the first gripper 60 and the second gripper 70 may be selected based on the shape of the object and the orientation of the object. The various grasping orientations of the first gripper 60 and the second gripper 70 may be described below.

Figure 8:
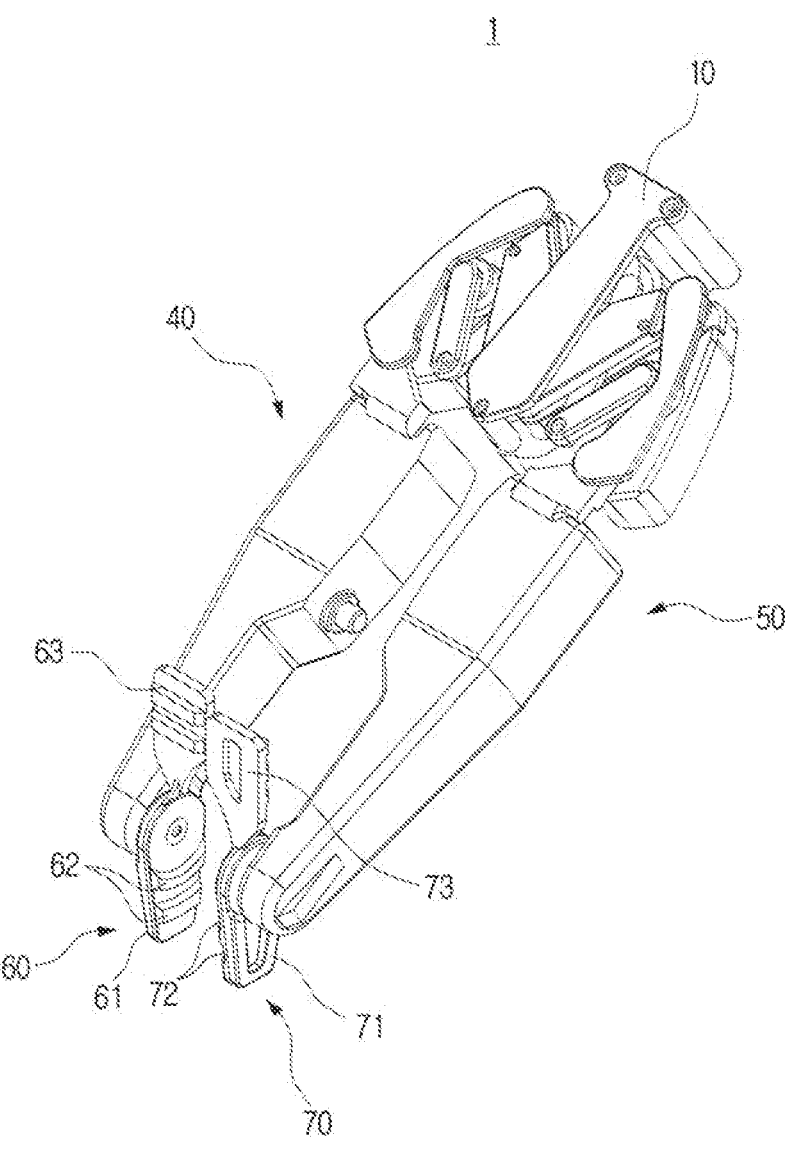
FIG. 8 is a diagram illustrating a first grasping orientation of a first gripper and a second gripper of a robot hand according to one or more embodiments.

FIG. 8 is a diagram illustrating a first grasping orientation of a first gripper and a second gripper of a robot hand according to one or more embodiments.

The first gripper 60 and the second gripper 70 of the robot hand 1 may select a first grasping orientation. The first grasping orientation may be an orientation in which the first gripper 60 and the second gripper 70 are disposed in parallel to each other as shown in FIG. 8 and the first grasping part 61 of the first gripper 60 and the fourth grasping part 71 of the second gripper 70 are disposed to face each other. The first gripper 60 and the second gripper 70 may be configured to grasp both sides of an object with the first grasping orientation.

If an object is placed at a lower side of the robot hand 1, the first gripper 60 and the second gripper 70 may be rotated such that the first grasping part 61 of the first gripper 60 and the fourth grasping part 71 of the second gripper 70 face a lower side as shown in FIG. 8 while in a state assuming the first grasping orientation.

In addition, if an object is placed at a front direction of the robot hand 1, the first gripper 60 and the second gripper 70 may be rotated such that the first grasping part 61 of the first gripper 60 and the fourth grasping part 71 of the second gripper 70 face the front direction of the robot hand 1 or rotated so as to be downwardly inclined while in the state assuming the first grasping orientation.

The robot hand 1 may be configured to grasp an object by approaching the object after having rotated at a predetermined angle for stably grasping the object according to the shape of the object, the position at which the object is placed, or the orientation of the object in a state the first gripper 60 and the second gripper 70 are set at the first grasping orientation.

Figure 9A:
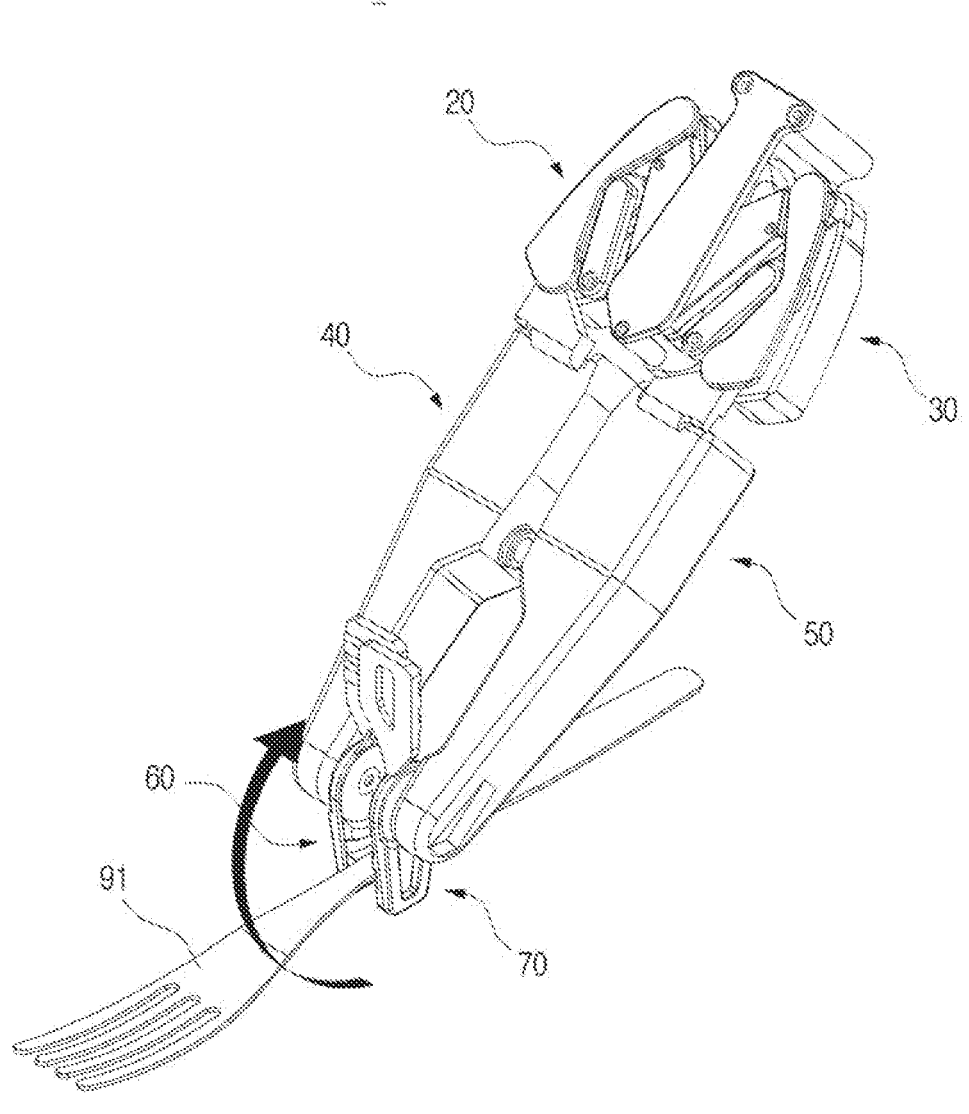
FIG. 9A is a diagram illustrating an example of a first gripper and a second gripper of a robot hand grasping an object in a first grasping orientation according to one or more embodiments.
Figure 9B:
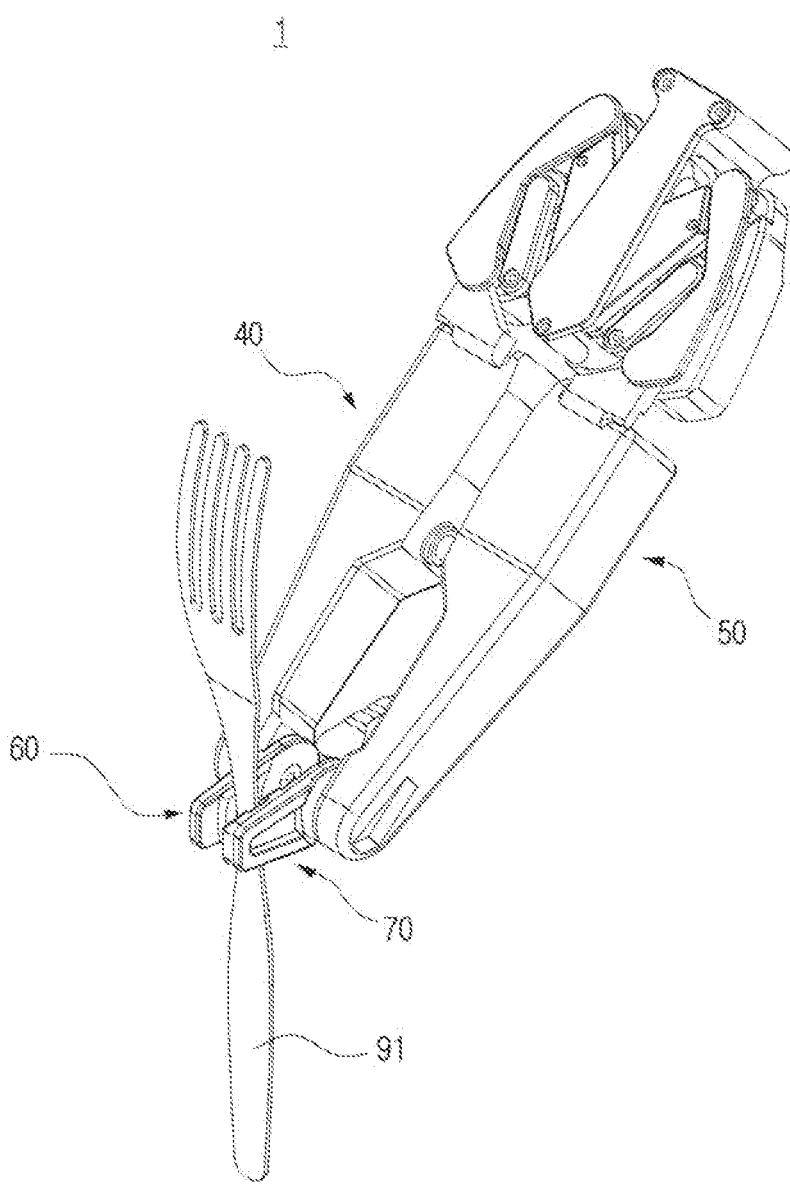
FIG. 9B is a diagram illustrating an example of rotating a first gripper and a second gripper of a robot hand in a same direction according to one or more embodiments.
Figure 9C:
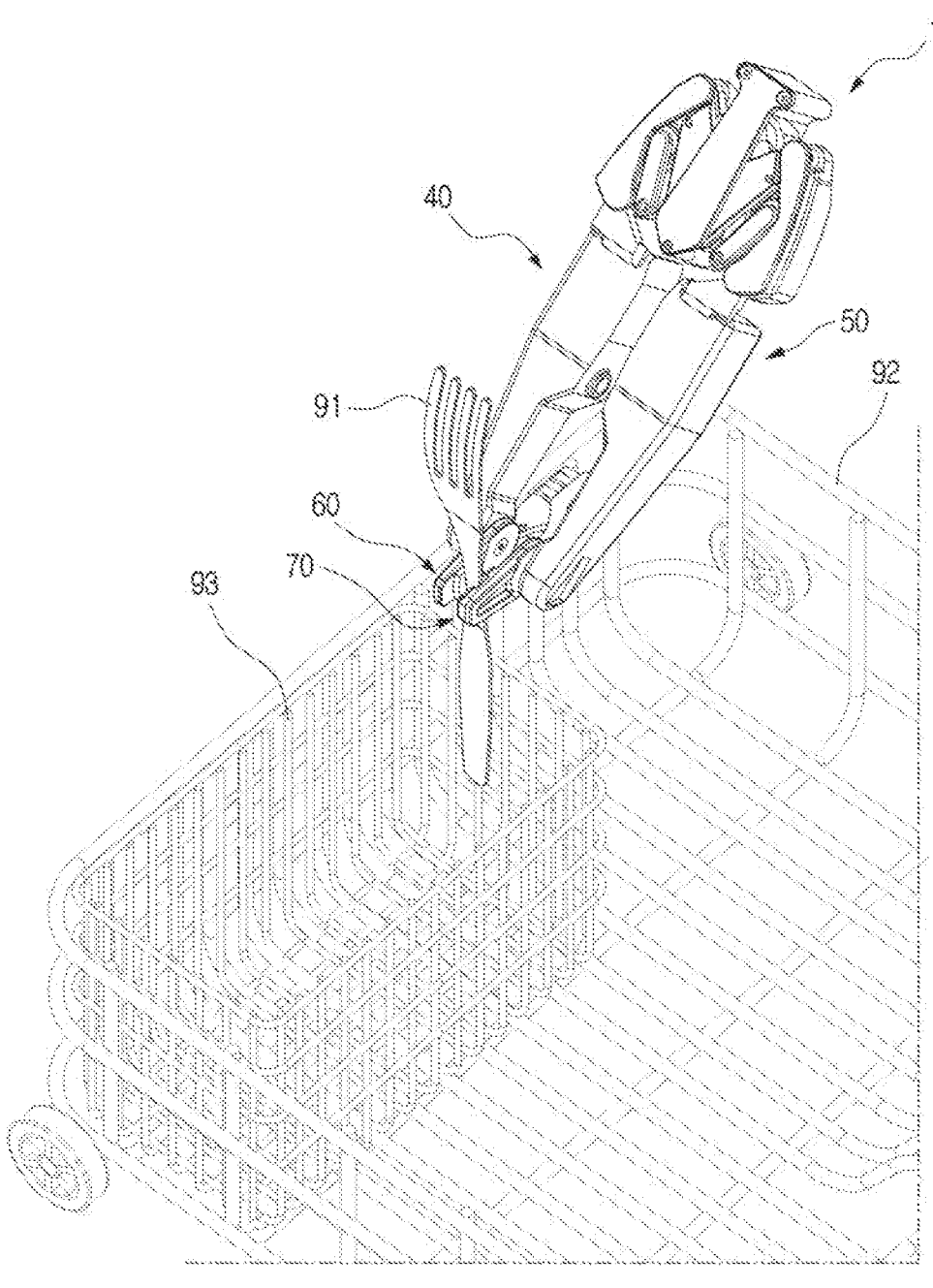
FIG. 9C is a diagram illustrating an example of a robot hand seating an object at a target position according to one or more embodiments.

FIG. 9A is a diagram illustrating an example of a first gripper and a second gripper of a robot hand grasping an object in a first grasping orientation according to one or more embodiments. FIG. 9B is a diagram illustrating an example of rotating a first gripper and a second gripper of a robot hand in a same direction according to one or more embodiments. FIG. 9C is a diagram illustrating an example of a robot hand seating an object at a target position according to one or more embodiments.

The robot hand 1 may be configured to set the first gripper 60 and the second gripper 70 at the first grasping orientation to grasp a first object 91.

Referring to FIG. 9A, the robot hand 1 may be configured to grasp the first object 91 while in the state assuming the first grasping orientation. The first object 91 may have an approximate shape that is narrow in width and long in length. The first object 91 has been described as a fork as an example, but is not limited thereto. The first object 91 may be a spoon, a chopstick, a ladle, or the like. In addition, the first object 91 may have a shape with both sides being symmetrical or asymmetrical. In addition, the first object 91 may have a shape with a width having a smaller width than a maximum spacing of the first finger part 40 and the second finger part 50.

The robot hand 1 may seat the first object 91 in a cutlery container 93 of a dish tray 92 disposed within a dish washer for washing. The cutlery container 93 may be a target position for seating the first object 91.

The robot hand 1 may change an orientation of the first object 91 according to a location at which the first object 91 is to be seated prior to seating the first object 91 in the cutlery container 93. For example, the robot hand 1 may rotate the first gripper 60 and the second gripper 70 at a predetermined angle (e.g., approximately 90 degrees) for a handle of the first object 91 to face a bottom direction as shown in FIG. 9B.

Referring to FIG. 9C, the robot hand 1 may approach the cutlery container 93 and seat the first object 91 in the cutlery container 93. In this case, because the robot hand 1 is in a state in which the first finger part 40 and the second finger part 50 are closely adjacent to each other, a width of the robot hand 1 may be narrowly changed. Accordingly, the robot hand 1 may be smoothly inserted inside the dish washer without interfering with a structure inside the dish washer. Here, the width of the robot hand 1 may correspond to a distance between a left side surface of the first finger part 40 and a right side surface of the second finger part 50.

Figure 10:
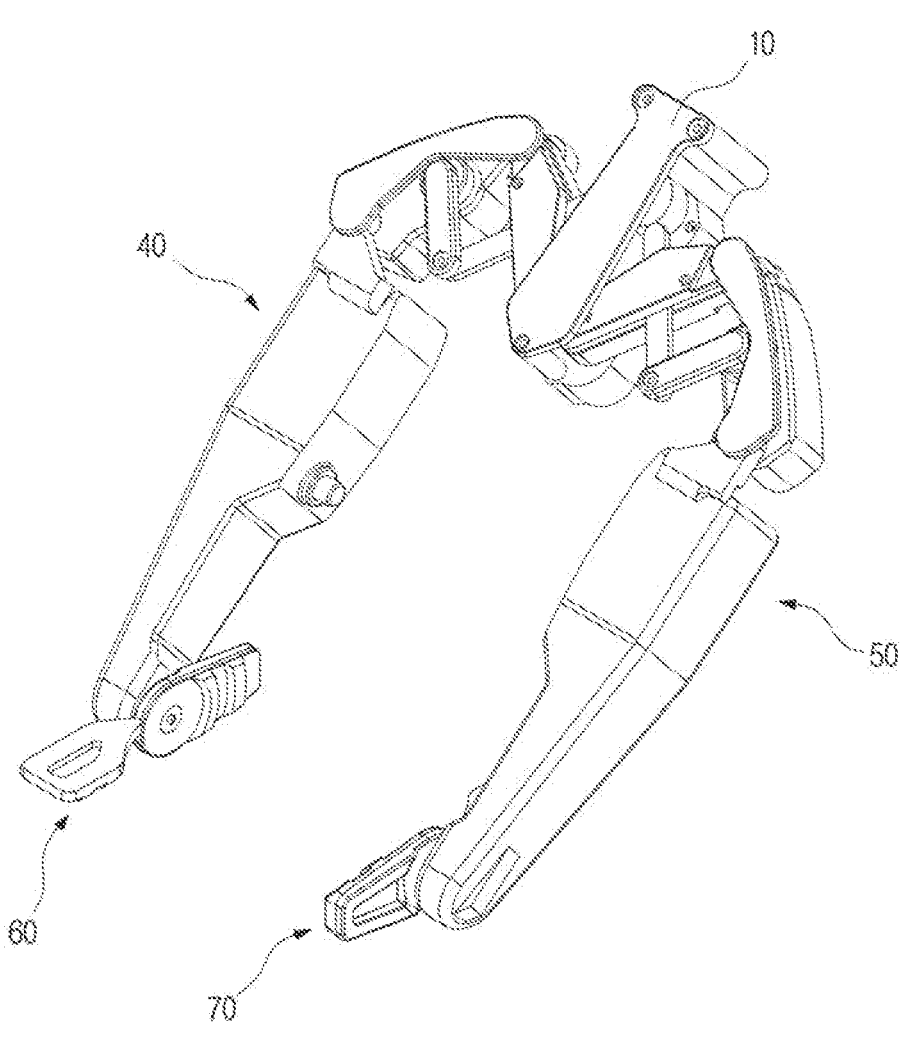
FIG. 10 is a diagram illustrating a second grasping orientation of a first gripper and a second gripper of a robot hand according to one or more embodiments.
Figure 11:
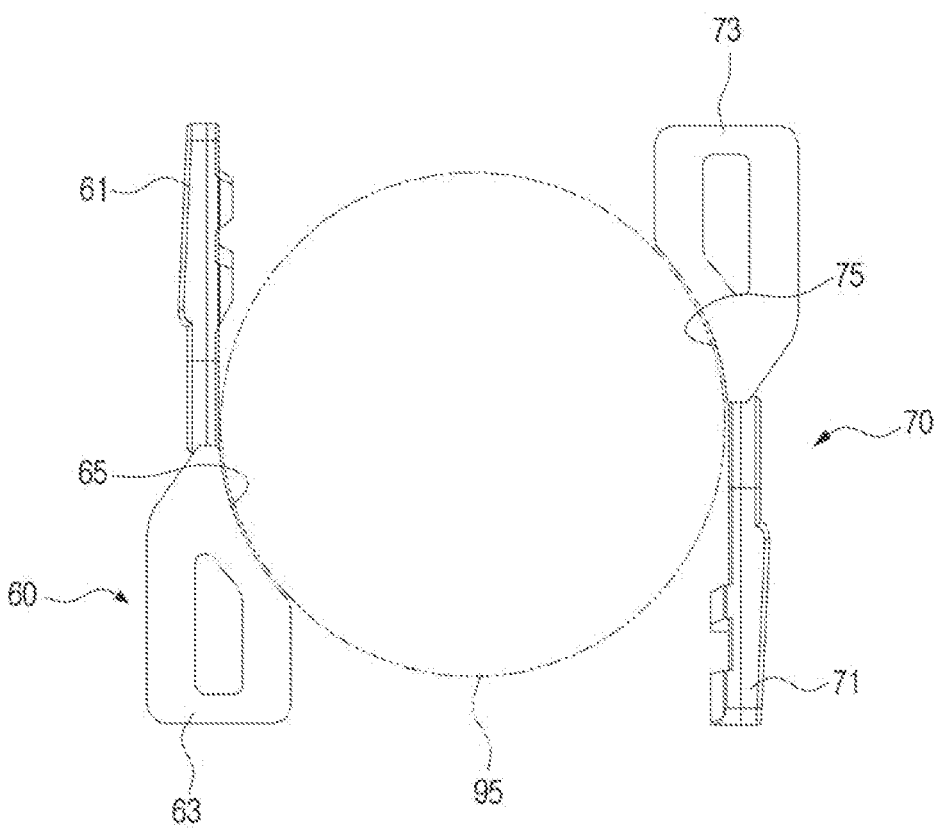
FIG. 11 is a plan view illustrating a second grasping orientation of the first gripper and the second gripper shown in FIG. 10.

FIG. 10 is a diagram illustrating a second grasping orientation of a first gripper and a second gripper of a robot hand according to one or more embodiments. FIG. 11 is a plan view illustrating a second grasping orientation of the first gripper and the second gripper shown in FIG. 10.

Referring to FIG. 10, the first gripper 60 and the second gripper 70 of the robot hand 1 may select a second grasping orientation. The second grasping orientation may be an orientation in which the first gripper 60 and the second gripper 70 are disposed in parallel with each other, and the second grasping part 63 of the first gripper 60 is disposed to face the fifth grasping part 73 of the second gripper 70.

Referring to FIG. 11, the first gripper 60 and the second gripper 70 may be configured to grasp both sides of a second object 95 in the second grasping orientation. The second object 95 may be formed such that an outer part thereof is a curved surface. Based on the second grasping part 63 of the first gripper 60 and the fifth grasping part 73 of the second gripper 70 being respectively formed to have gentle curvatures, the second object 95 may be stably grasped by the second grasping part 63 of the first gripper 60 and the fifth grasping part 73 of the second gripper 70.

Figure 12A:
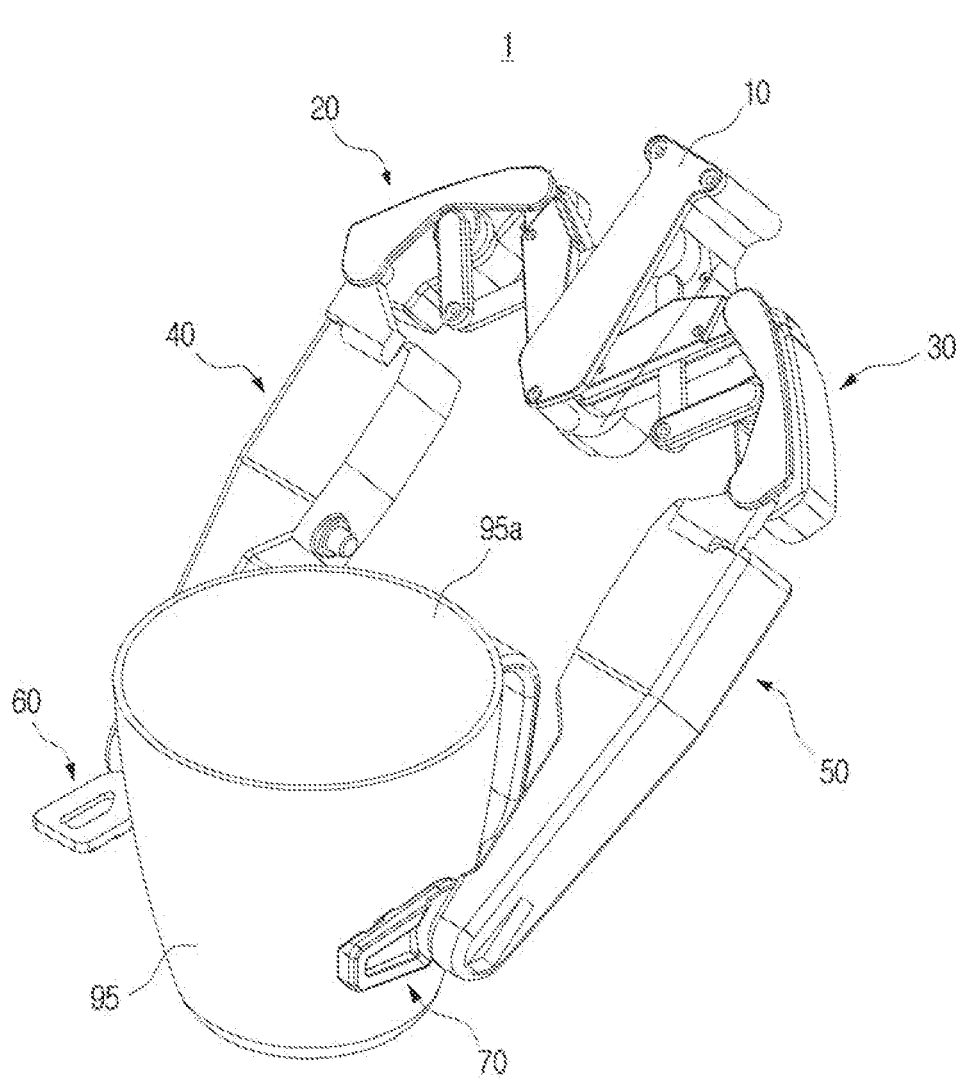
FIG. 12A is a diagram illustrating an example of a first gripper and a second gripper of a robot hand grasping an object in a second grasping orientation according to one or more embodiments.
Figure 12B:
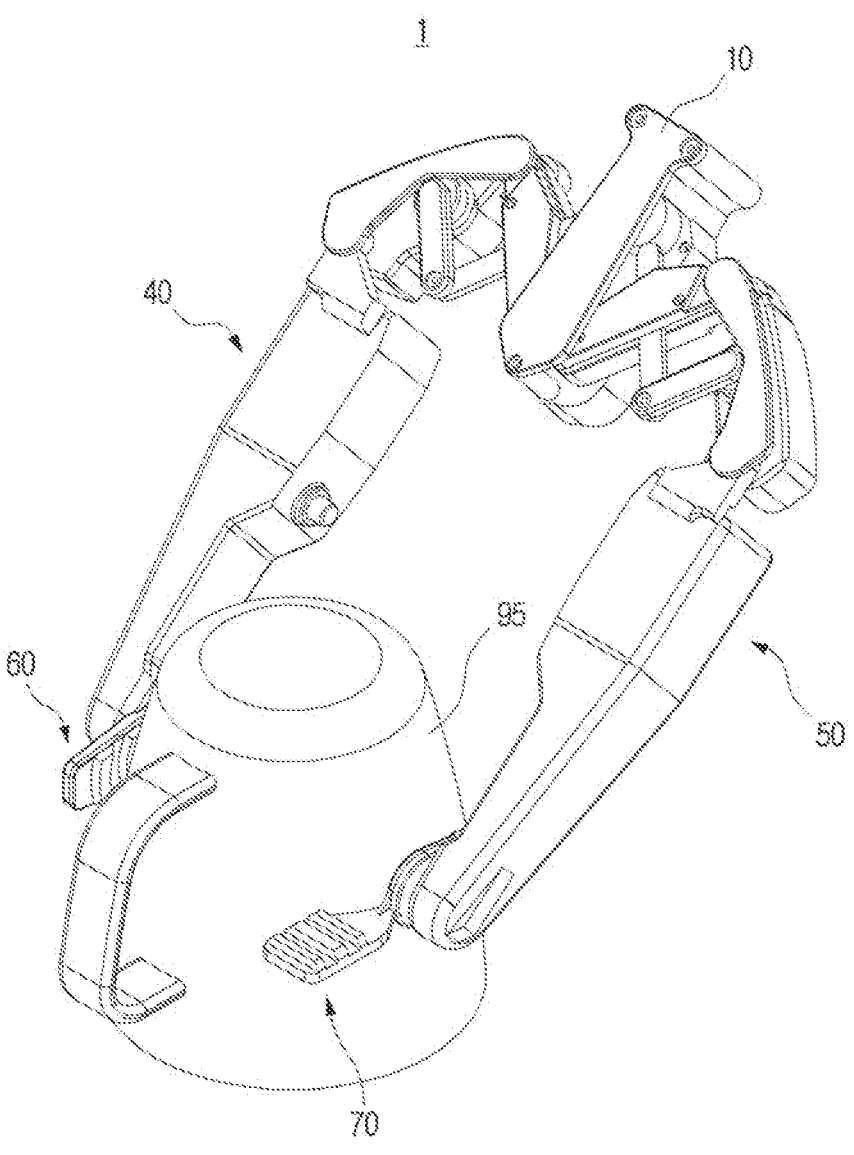
FIG. 12B is a diagram illustrating an example of rotating a first gripper and a second gripper of a robot hand in a same direction according to one or more embodiments.
Figure 12C:
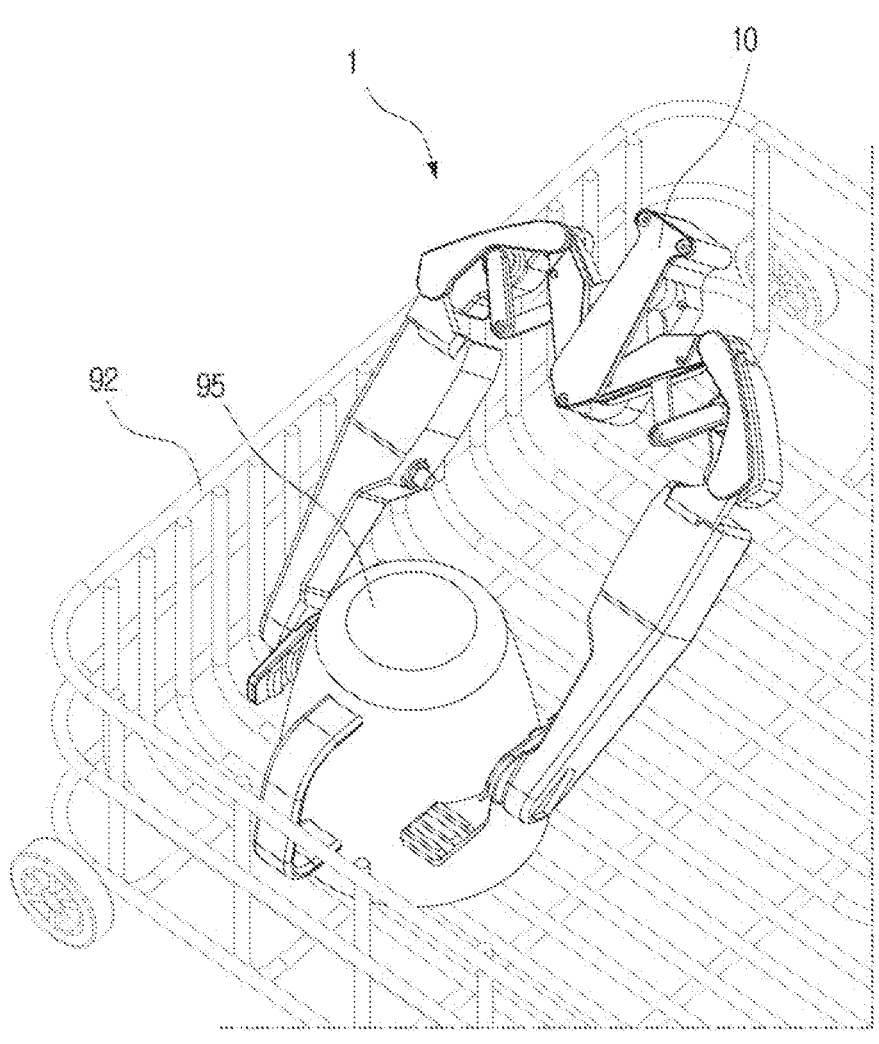
FIG. 12C is a diagram illustrating an example of a robot hand seating an object at a target position according to one or more embodiments.

FIG. 12A is a diagram illustrating an example of a first gripper and a second gripper of a robot hand grasping an object in a second grasping orientation according to one or more embodiments. FIG. 12B is a diagram illustrating an example of rotating a first gripper and a second gripper of a robot hand in a same direction according to one or more embodiments. FIG. 12C is a diagram illustrating an example of a robot hand seating an object at a target position according to one or more embodiments.

The robot hand 1 may set the first gripper 60 and the second gripper 70 in the second grasping orientation to grasp the second object 95.

Referring to FIG. 12A, the robot hand 1 may be configured to grasp the second object 95 in a state assuming the second grasping orientation. The second object 95 may be a term for designating an object of a different shape from the first object 91. Specifically, objects corresponding to the first object may fall within a range of same or similar shapes with one another, and objects corresponding to the second object may fall within a range of same or similar shapes with one another. Accordingly, the first object 91 and the second object 95 may be differentiated from each other by shape characteristics, and a grasping orientation for grasping the first object 91 and a grasping orientation for grasping the second object 95 that is to be assumed by the robot hand 1 according to the shapes of the first object 91 and the second object 95 may be different from each other.

The second object 95 may have an approximate shape with the outer part thereof formed in a curved surface. The second object 95 has been described as a cup as an example, but is not limited thereto. The second object 95 may be a bottle or a cylindrical storage container, a baby bottle, a wine glass, or the like. In addition, the second object 95 may have a shape with both sides being symmetrical or asymmetrical.

The robot hand 1 may seat the second object 95 in the dish tray 92 disposed within the dish washer for washing. The dish tray 92 may be a target position for seating the second object 95.

The robot hand 1 may change an orientation of the second object 95 according to a location at which the second object 95 is to be seated prior to seating the second object 95 in the dish tray 92. For example, the robot hand 1 may rotate the first gripper 60 and the second gripper 70 at a predetermined angle (e.g., approximately 180 degrees) for an opening 95*a* to face the bottom direction to prevent water from gathering inside of the second object 95 as in FIG. 12B.

Referring to FIG. 12C, the robot hand 1 may approach the dish tray 92 and seat the second object 95 in the dish tray 92. In this case, the robot hand 1 may be changed to a width smaller than a width of a state in which the first finger part 40 and the second finger part 50 are opened at a maximum spacing because the first finger part 40 and the second finger part 50 are in a state closely adjacent with each other. Accordingly, the robot hand 1 may be smoothly inserted inside the dish washer in a state of grasping the second object 95 without interference with the structure inside the dish washer.

Figure 13:
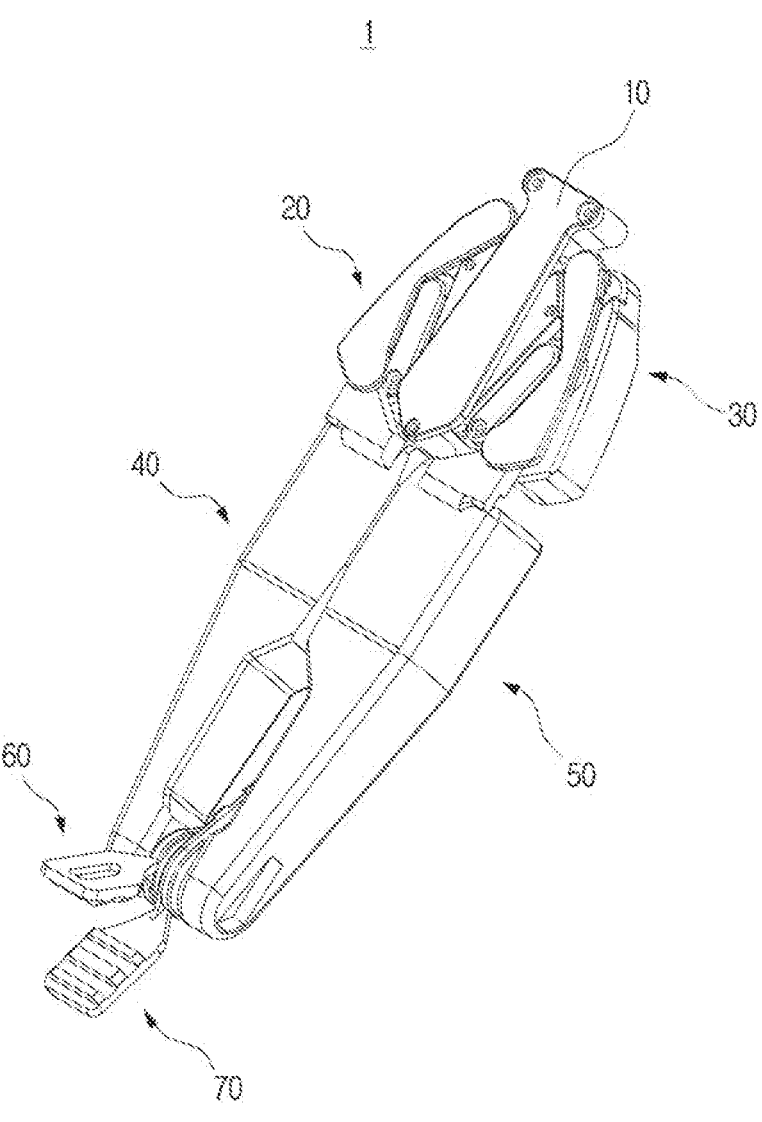
FIG. 13 is a diagram illustrating a third grasping orientation of a first gripper and a second gripper of a robot hand according to one or more embodiments.

FIG. 13 is a diagram illustrating a third grasping orientation of a first gripper and a second gripper of a robot hand according to one or more embodiments.

Referring to FIG. 13, the first gripper 60 and the second gripper 70 of the robot hand 1 may select a third grasping orientation. The third grasping orientation may be an orientation in which the first gripper 60 and the second gripper 70 are configured to grasp an object with the scissoring motion.

The robot hand 1 may drive, in order to assume the third grasping orientation, the first linking part 20 and the second linking part 30 to move to a position at which the first finger part 40 and the second finger part 50 contact each other and reduce the lengths of the first linking part 20 and the second linking part 30.

When the first finger part 40 and the second finger part 50 contact each other, the operation button 45*a* of the first finger part 40 may be pressed by the pressing part 55 of the second finger part 50. Based on the operation button 45*a* being pressed, the locking pin 48*a* may be inserted in the groove member 58 by hydraulic pressure (referring to FIG. 7).

In this case, the third grasping part 65 of the first gripper 60 may be disposed to face the sixth grasping part 75 of the second gripper 70. The robot hand 1 may rotatably drive the first gripper 60 and the second gripper 70 for the third grasping part 65 of the first gripper 60 and the sixth grasping part 75 of the second gripper 70 to rotate in a direction of becoming closer with each other and grasp the object.

Figure 14A:
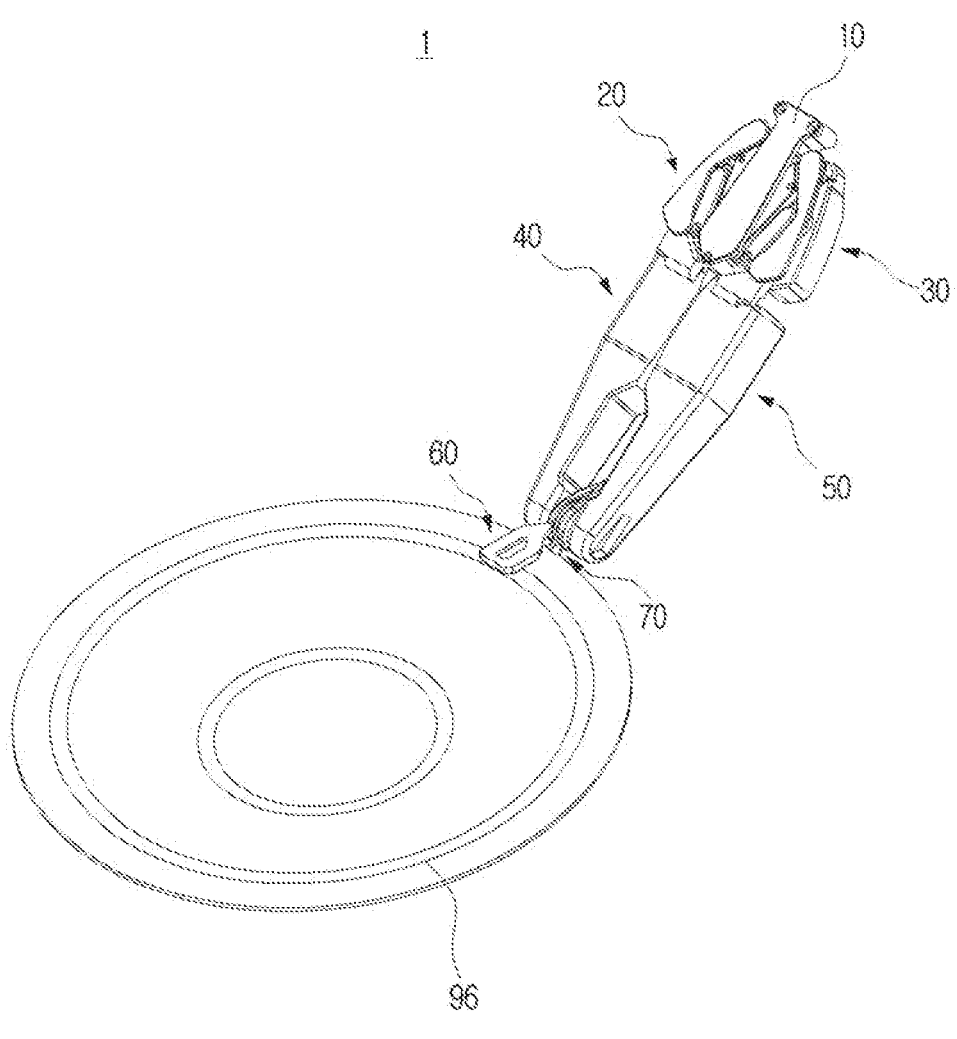
FIG. 14A is a diagram illustrating an example of a first gripper and a second gripper of a robot hand grasping an object in a third grasping orientation according to one or more embodiments.
Figure 14B:
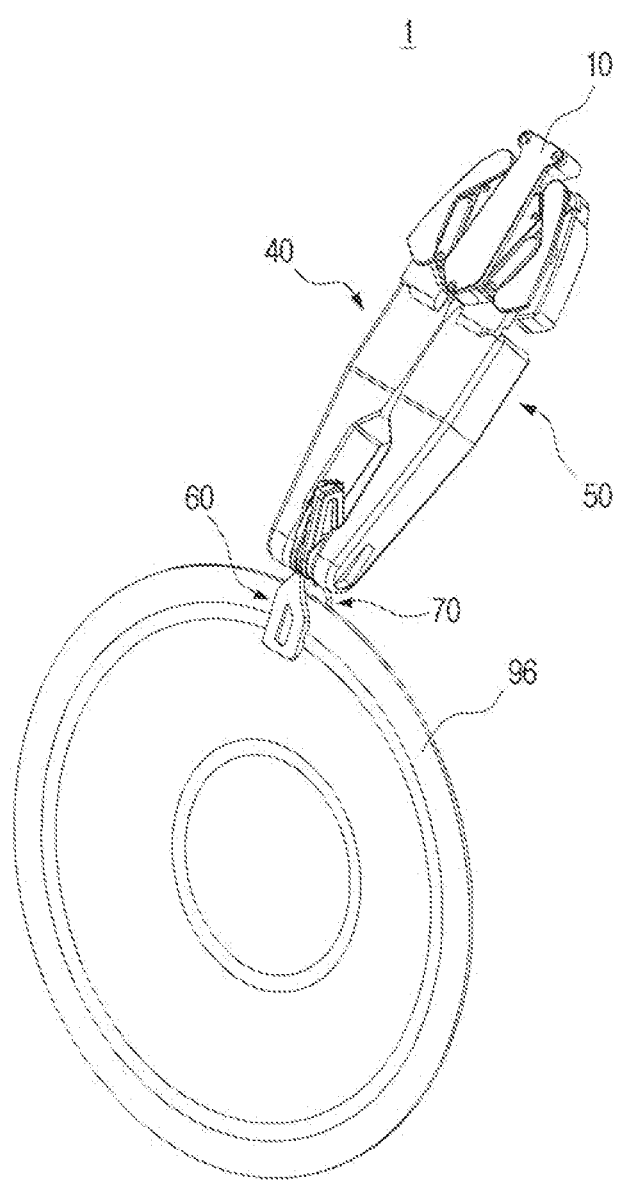
FIG. 14B is a diagram illustrating an example of rotating a first gripper and a second gripper of a robot hand in a same direction according to one or more embodiments.
Figure 14C:
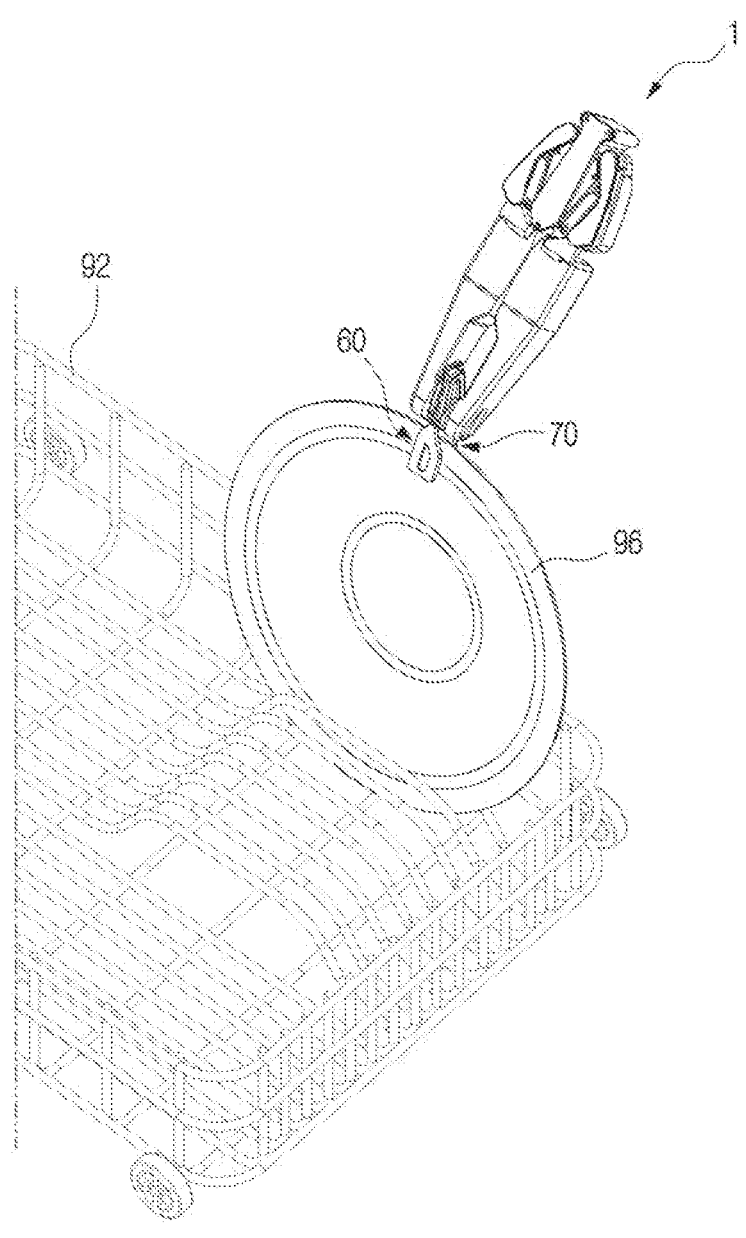
FIG. 14C is a diagram illustrating an example of a robot hand seating an object at a target position according to one or more embodiments.

FIG. 14A is a diagram illustrating an example of a first gripper and a second gripper of a robot hand grasping an object in a third grasping orientation according to one or more embodiments. FIG. 14B is a diagram illustrating an example of rotating a first gripper and a second gripper of a robot hand in a same direction according to one or more embodiments. FIG. 14C is a diagram illustrating an example of a robot hand seating an object at a target position according to one or more embodiments.

Referring to FIG. 14A, the robot hand 1 may be configured to grasp a third object 96 while in a state of assuming the third grasping orientation. The third object 96 may roughly have a flat plate shape. The third object 96 may be, for example, a plate, a cup saucer, a pot stand, or the like.

The robot hand 1 may seat the third object 96 in the dish tray 920 disposed within the dish washer for washing. The dish tray 92 may be the target position for seating the third object 96.

The robot hand 1 may change an orientation of the third object 96 according to a location at which the third object 96 is to be seated prior to seating the third object 96 in the dish tray 92. For example, the robot hand 1 may rotate the first gripper 60 and the second gripper 70 at a predetermined angle (e.g., approximately 90 degrees) for moisture on the third object 96 to flow down and be well dried well as shown in FIG. 14B.

Referring to FIG. 14C, the robot hand 1 may approach the dish tray 92 and seat the third object 96 in the dish tray 92. In this case, the robot hand 1 may be changed to a width smaller than a width of a state in which the first finger part 40 and the second finger part 50 are opened at maximum spacing because the first finger part 40 and the second finger part 50 are in a closely adjacent state with each other. Accordingly, the robot hand 1 may be smoothly inserted inside the dish washer grasping the third object 96 without interfering with a structure inside the dish washer.

The robot hand 1 according to one or more embodiments may be applied to a service robot. The service robot may be used applied to a robot that assists in housework, a serving robot that transports food or dishes in restaurants or the like, a robot that performs various work at industrial sites, and the like. An example of the service robot according to one or more embodiments described below being applied with the above-described robot hand 1 and performing housework (e.g., a work of transporting used dishes to the dish washer) will be described.

As described in the above-described various embodiments, the robot hand may operate changing the orientation to different forms according to the shape, the orientation, or the like of the object to be grasped. A method of recognizing the shape or orientation of the object to be grasped may be variously implemented. In an example, the shape, the orientation, or the like of the object may be recognized based on a captured image using a camera. The embodiments described above will be described in detail below.

Figure 15:
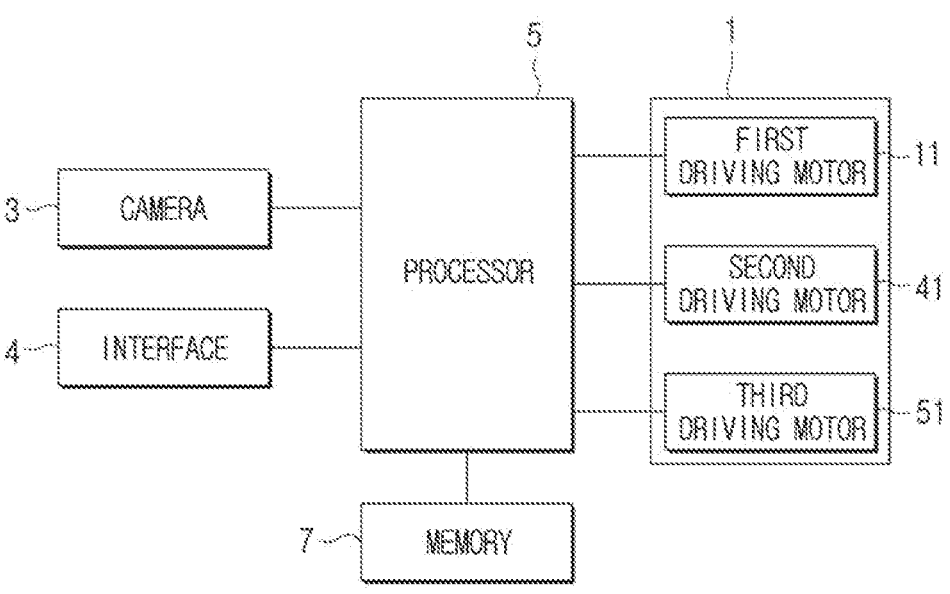
FIG. 15 is a block diagram of a service robot including a robot hand according to one or more embodiments.

FIG. 15 is a block diagram of a service robot including a robot hand according to one or more embodiments. The service robot according to one or more embodiments may recognize the shape and orientation of the object to be grasped, stably grasp the object by selecting one orientation from among the various grasping orientations that can be implemented by the robot hand according to the recognized result, and transport the object to the target position.

Referring to FIG. 15, a service robot 100 according to one or more embodiments may include the robot hand 1, a camera 3, an interface 4, a processor 5, and a memory 7. The robot hand 1 may include the first driving motor 11, the second driving motor 41, and the third driving motor 51, the driving of which may be controlled by the processor 5. In FIG. 15, the service robot 100 has been shown as an integrated type with the camera 3 and the robot hand 1, but the service robot 100 may be implemented as a terminal device which is connected with the camera 3, the robot hand 1, and the like through a communication interface at implementation. That is, after receiving a captured image from the camera 3 disposed at a position at which an object can be captured in a wireless or wired method, the captured image may be analyzed and implemented with an electronic device such as a personal computer (PC) or laptop, a mobile phone, a kiosk, or the like that controls a motion of the robot hand 1. The description described below may be applicable to not only an example of each elements of FIG. 15 being included in the service robot 100, but also applicable to even when implemented as an external device connected through a communication method.

The camera 3 may be a device for capturing an object. One or a plurality of cameras 3 may be used.

The camera 3 may obtain an image of an object at a surrounding of the service robot. The camera 3 may capture a still image or a moving image. For example, the camera 3 may include at least one image sensor (e.g., a front surface sensor or a back surface sensor), a lens, an image signal processor (ISP), or a flash (e.g., LED or xenon lamp, etc.). At this time, the camera 3 may be activated when a specific condition is satisfied to prevent unnecessary power consumption. For example, the processor 5 may control for the camera 3 to be turned on and perform capturing when a movement at the surrounding is detected, when a user command is input, when a pre-set motion time arrives, or the like using a motion detection sensor, or the like which is driven at low power compared to the camera 3.

An interface 4 may be a configuration for receiving a signal or data from various external means. The interface 4 may be implemented in various forms such as, for example, and without limitation, an input and output interface connected with input means such as a keyboard, a mouse, or a microphone or an output means such as a display device or a speaker, a communication interface configured to perform communication with an external device, an interface configured to connect with external storage means such as a universal serial bus (USB) memory, or the like.

A user may input directly input data through the interface 4, and the service robot may receive input data through an external device. Alternatively, all data input through the two routes may be utilized as input data. In FIG. 15, the camera 3 and the processor 5 have been shown as directly connected, but in case the camera 3 is implemented as an external device separate from the service robot 100, data or various control signals captured in the camera 3 may also be transmitted and received through the interface 4. The processor 5 may be an element for controlling the overall motion of the service robot 100. The processor 5 may be formed of one or a plurality of processors. The one or the plurality of processors may include at least one from among a central processing unit (CPU), a graphic processing unit (GPU), or a neural processing unit (NPU), but is not limited to the example of the above-described processor.

The CPU may be a generic-purpose processor capable of performing not only general computations but also artificial intelligence computations, and may effectively execute a complex program through a multi-tiered cache structure. The CPU may be advantageous in a series processing method which allows for an organic connection of a previous calculation result and a following calculation result to be possible through sequential calculations. The generic-purpose processor is not limited to the above-described example except for when specified as the above-described CPU.

The GPU may be a processor for mass computations such as floating point computations used in graphic processing, and perform large-scale computations in parallel by integrating cores in large numbers. Specifically, the GPU may be advantageous a parallel processing method such as a convolution computation compared to the CPU. In addition, the GPU may be used as an auxiliary processor (co-processor) for supplementing a function of the CPU. The processor for mass computation is not limited to the above-described example except for when specified as the above-described GPU.

The NPU may be a processor specializing in artificial intelligence computation which uses an artificial neural network, and each layer that form the artificial neural network may be implemented with hardware (e.g., silicon). At this time, because the NPU is designed specialized according to a required specification of a company, there is a lower degree of freedom compared to the CPU or the GPU, but the NPU may effectively process the artificial intelligence computation required by the company. Meanwhile, as a processor specializing in artificial intelligence computation, the NPU may be implemented in various forms such as, for example, and without limitation, a tensor processing unit (TPU), an intelligence processing unit (IPU), a vision processing unit (VPU), or the like. The artificial intelligence processor is not limited to the above-described example except for when specified as the above-described NPU.

In addition, the one or the plurality of processors may be implemented as a system on chip (SoC). At this time, in the SoC, the memory 7 and a network interface such as a Bus for data communication between the processor 5 and the memory 7 may be further included in addition to the one or the plurality of processors.

If the plurality of processors are included in the system on chip (SoC) included in the service robot according to one or more embodiments, the service robot may perform a computation associated with artificial intelligence (e.g., a computation associated with learning or inference of an artificial intelligence model) using a portion of the processors from among the plurality of processors. For example, the service robot may perform computations associated with artificial intelligence using at least one from among the GPU, the NPU, the VPU, the TPU, or a hardware accelerator which specialize in artificial intelligence computations such as convolution computations and matrix multiplication computations from among the plurality of processors. However, the above is one embodiment, and computations associated with object recognition functions may be processed using the generic-purpose processor such as the CPU.

The processor 5 may input the captured image of the camera 3 in an artificial intelligence model, and analyze the captured image. The processor 5 may determine what type is the object, what orientation is the object placed, or the like that is captured by the camera 3 based on an output value of the artificial intelligence model. The artificial intelligence model may be trained based on captured images that captured various objects placed in various orientations and labeling data associated therewith.

The memory 7 may be an element for storing various programs and data necessary in a motion of the service robot. The memory 7 may include a volatile memory or a non-volatile memory. A program may be stored in the memory 7 as software, and may include, for example, an operating system, a middleware, or an application.

In the data stored in the memory 7, shapes of various products belong to dishware and a plurality of images corresponding to an orientation to which the product is placed may be included. For example, a plurality of images that captured one cup from among the dishware from various angles, images that captured various orientations of a state in which one cup is placed, images of cups of various types, and the like may be included.

The processor 5 may train the artificial intelligence model based on data stored in the memory 7 or a separate storage medium (a HDD, an external hard disk, a flash memory stick, etc.). Then, when the image of the object captured from the camera 3 is input, the shape of the object may be identified using the trained artificial intelligence model and a grasping orientation of the robot hand 1 suitable for grasping the object may be identified based therefrom.

For example, the first grasping orientation may be an orientation for grasping an object which has a thin and long shape (e.g., a spoon, chopsticks, ladle, etc.). The first grasping orientation may be an orientation in which the first gripper 60 and the second gripper 70 of the robot hand 1 are arranged in parallel and the first grasping part 61 of the first gripper 60 and the fourth grasping part 71 of the second gripper 70 are disposed to face each other (referring to FIG. 8). For example, the second grasping orientation may be an orientation for grasping an object having an approximate shape with an outer part being formed as a curved surface (e.g., a bottle or a cylindrical storage container, a baby bottle, a wine glass, etc.). The second grasping orientation may be an orientation in which the first gripper 60 and the second gripper 70 are disposed in parallel with each other and the second grasping part 63 of the first gripper 60 is disposed to face the fifth grasping part 73 of the second gripper 70 (referring to FIG. 10). For example, the third grasping orientation may be an orientation for grasping an object having an approximately flat plate shape (e.g., a dish, a cup saucer, a pot stand, etc.). However, the orientation for grasping the object with the robot hand 1 is not limited to the first, second, and third grasping orientations.

The first driving motor 11 may drive the first linking part 20 and the second linking part 30 of the robot hand 1 together. The first driving motor 11 may be provided at the supporting part 10 (referring to FIG. 1). The second driving motor 41 may drive the first gripper 60 provided at the front end part of the first finger part 40 as shown in FIG. 5A to forward rotate or reverse rotate (referring to FIG. 5A). The third driving motor 51 may drive the second gripper 70 provided at the front end part of the second finger part 50 to forward rotate or reverse rotate (referring to FIG. 5B).

Meanwhile, in FIG. 15, an embodiment of analyzing an image captured using a camera by using an artificial intelligence model has been described, but the type, the orientation, or the like of the object may be determined with a method different from the above.

In an example, the user may directly select the type of the object prior to using the robot hand 1. For example, in Korean cuisine, dishes of a concave form such as soup bowls, rice bowls, and pots are commonly used, and in western cuisine, dishes of a wide plate form are commonly used. If the user selects modes such as Korean cuisine, western cuisine, Japanese cuisine, and the like, the processor 5 may change the orientation of the robot hand 1 accordingly.

In another example, the form may be determined by directly analyzing the captured image without using the artificial intelligence model. Specifically, when the captured image is received, the processor 5 may classify the whole pixels of the captured image into a plurality of pixel groups, and detect a representative pixel value (e.g., an average pixel value, etc.) of each pixel group. The processor 5 may detect a plurality of pixel groups with representative pixel values of a similar range being disposed consecutively, and distinguish each of the objects in the captured image by recognizing the positions of the pixels groups corresponding to a border with other representative pixel values as a border surface. Then, the processor 5 may compare a pre-stored image with an arrangement form of the pixel groups corresponding to the distinguished objects, and determine whether the corresponding object is a dish or a plate. According to an embodiment, a method of directly analyzing each of the captured images in this method may be applied.

Figure 16:
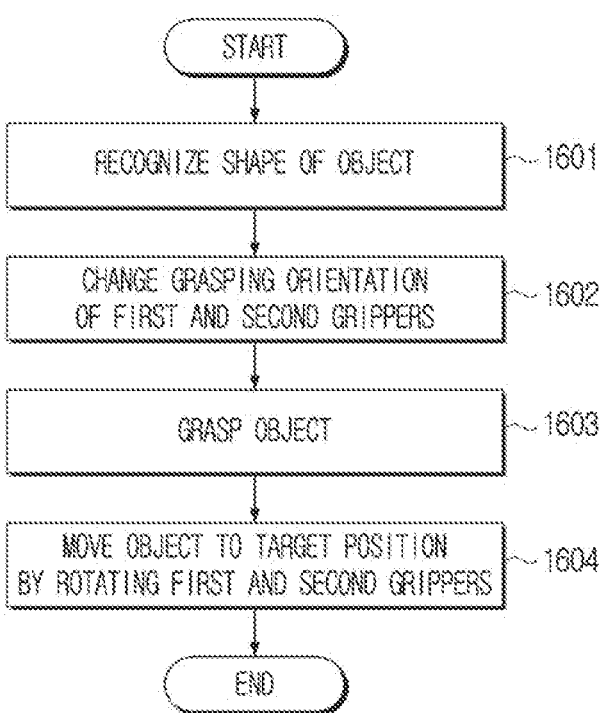
FIG. 16 is a flowchart illustrating a control process of a service robot which includes a robot hand according to one or more embodiments.

In still another example, the user may directly notify the service robot 100 of the type of the object through methods such as a voice recognition or a motion recognition. FIG. 16 is a flowchart illustrating a control process of a service robot which includes a robot hand according to one or more embodiments.

The service robot 100 may perform a motion corresponding to a relevant command when the user command is input through the interface 4. For example, when the user inputs a command for grasping an object (e.g., a fork) and moving to a target position (e.g., a cutlery container of a dish tray disposed within the dish washer), the processor 5 may control the camera 3 to capture the object.

The processor 5 may compare the image of the object obtained through the camera 3 with learned data stored in the memory 7, and recognize the shape of the object (1601 in FIG. 16). In this case, the processor 5 may recognize not only the shape of the object, but also the orientation to which the object is placed.

The processor 5 may identify one grasping orientation from among various grasping orientations (e.g., the first grasping orientation, the second grasping orientation, and the third grasping orientation) of the first gripper and the second gripper based on the shape of the recognized object or the shape of the object and the orientation of the object (1602 in FIG. 16).

If an orientation for grasping an object is identified as the first grasping orientation, the processor 5 may vary the lengths of the first linking part 20 and the second linking part 30 by controlling the first driving motor 11 for the first linking part 20 and the second linking part 30 to be opened at a predetermined spacing. In addition, the processor 5 may control the second driving motor 41 and the third driving motor 51 and arrange the first gripper 60 and the second gripper 70 of the robot hand 1 in parallel. In this case, the first grasping part 61 of the first gripper 60 and the fourth grasping part 71 of the second gripper 70 may be disposed to face each other.

For example, if the robot hand 1 is installed at the robot arm, the processor 5 may control the robot arm for the robot hand 1 to approach an object. In this case, the robot arm may be driven by the fourth driving motor, and the processor 5 may change the position of the robot arm by removing the fourth driving motor. The robot hand 1 may be positioned such that the object is positioned between the first grasping part 61 of the first gripper 60 and the fourth grasping part 71 of the second gripper 70.

The processor 5 may control the first driving motor 11 and vary such that the lengths of the first linking part 20 and the second linking part 30 are reduced. Accordingly, the first finger part 40 and the second finger part 50 may move in a direction of becoming closer with each other, and an object may be grasped by the first grasping part 61 of the first gripper 60 and the fourth grasping part 71 of the second gripper 70 (1603 in FIG. 16).

The processor 5 may recognize the target position by capturing the target position (e.g., the dish tray of the dish washer) to which the object is to be placed by controlling the camera 3. In this case, the target position may be recognized with 3-dimensional coordinates calculated from the position of the robot hand 1.

The processor 5 may identify a rotation angle of the first gripper 60 and the second gripper 70 for the handle of the object to face the bottom direction prior to seating the object (e.g., the fork, referring to FIG. 9A) in the target position (e.g., the cutlery container of the dish tray disposed within the dish washer, referring to FIG. 9C). The processor 5 may control the second driving motor 41 and the third driving motor 51 and rotate the first object 91 grasped by the first grasping part 61 of the first gripper 60 and the fourth grasping part 71 of the second gripper 70 at a predetermined angle (1604 in FIG. 16).

In addition, the processor 5 may determine whether a change in the orientation of the object is necessary when seating the object at the recognized target position by the robot hand 1. For example, the processor may determine, when there is a structure present at a surrounding of the recognized target position, whether there is interference of the robot hand 1 to the structure or of the object grasped by the robot hand 1, and identify the rotation angle of the first gripper 60 and the second gripper 70 based therefrom.

The processor 5 may control the robot arm for the robot hand 1 to be moved to the recognized target position. When the robot hand 1 is transported to the target position, the processor 5 may move the first finger part 40 and the second finger part 50 to a direction of becoming farther apart by varying the lengths of the first linking part 20 and the second linking part 30 by controlling the first driving motor 11. Accordingly, the object may be stably seated at the target position (e.g., the cutlery container of the dish tray disposed within the dish washer, referring to FIG. 9C).

As described above, the service robot according to one or more embodiments may be configured to recognize the shape of the object to be grasped and the orientation at which the object is placed, and identify the grasping orientation of the robot hand 1 based on the recognized orientation. The identified grasping orientation may be an orientation for stably grasping the object.

Figure 17:
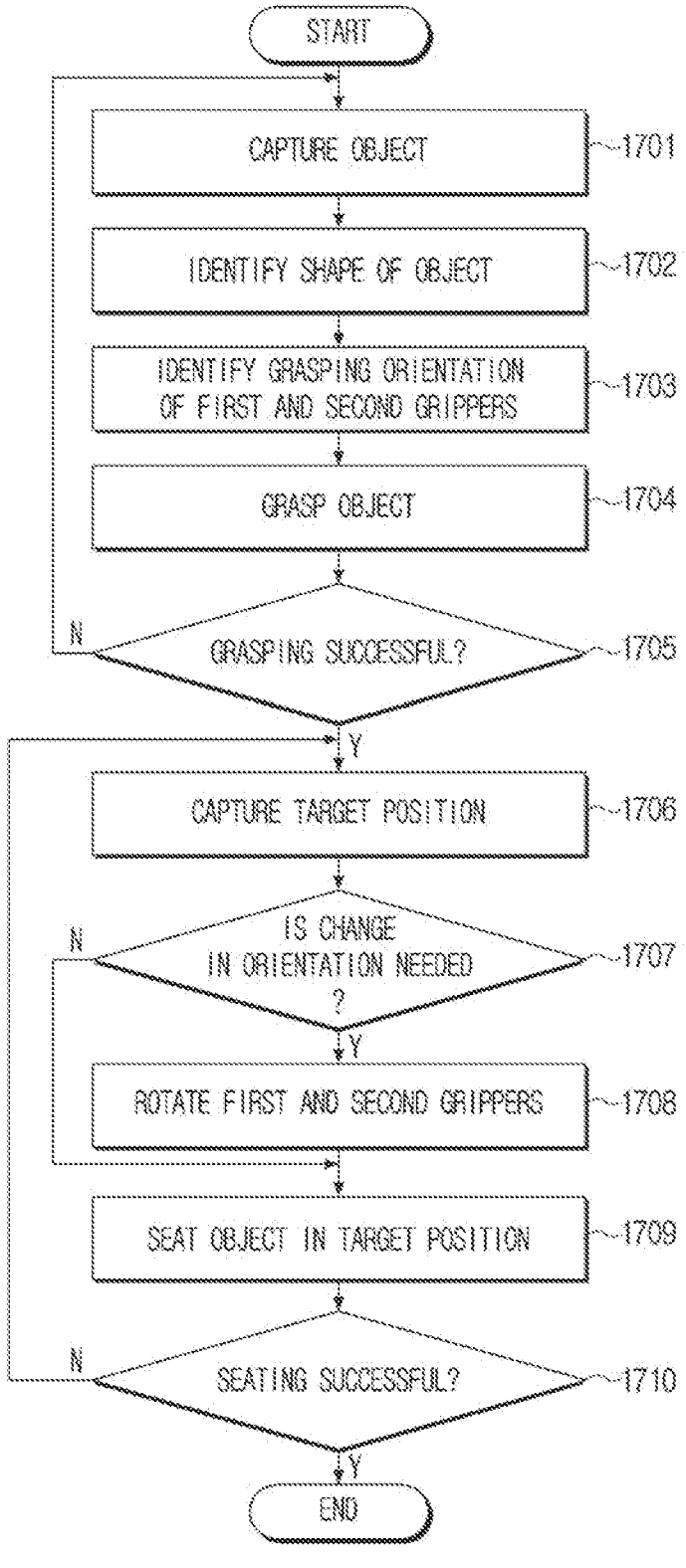
FIG. 17 is a flowchart illustrating in detail a control process of a service robot which includes a robot hand according to one or more embodiments.

FIG. 17 is a flowchart illustrating in detail a control process of a service robot which includes a robot hand according to one or more embodiments.

The processor 5 may control the camera 3 and obtain an image of an object by capturing the object (1701 in FIG. 17).

The processor 5 may identify the shape of the object by comparing with data stored in the memory 7 based on the captured image (1702 in FIG. 17). In this case, the processor 5 may recognize not only the shape of the object, but also the orientation at which the object is placed.

The processor 5 may identify the grasping orientation of the first gripper 60 and the second gripper 70 based on the shape of the object or the shape of the object and the orientation of the object (1703 in FIG. 17). The processor 5 may arrange the first gripper 60 and the second gripper 70 in the identified grasping orientation by controlling the second driving motor 41 and the third driving motor 51.

The processor 5 may grasp the object with the first gripper 60 and the second gripper 70 by controlling the first driving motor 11 (1704 in FIG. 17).

If the object is not grasped by the first gripper 60 and the second gripper 70, the processor 5 may repeat steps 1701, 1702, 1703 and 1704 in FIG. 17 described above, or proceed to a following step if grasping of the object is successful (1705 in FIG. 17). As described above, a control method of the service robot may include stably grasping, based on not being able to grasp the object with the grasping orientation of the identified object, the object after changing the grasping orientation.

The processor 5 may control the camera 3 and capture the grasped state of the object by the first gripper 60 and the second gripper 70, and determine whether the object is grasped based on the captured image. Alternatively, the processor 5 may determine whether the object is grasped through data obtained by a weight sensor provided at the robot hand 1.

The processor 5 may capture the target position to which the object is to be placed by controlling the camera 3 (1706 in FIG. 17).

Figure 18:
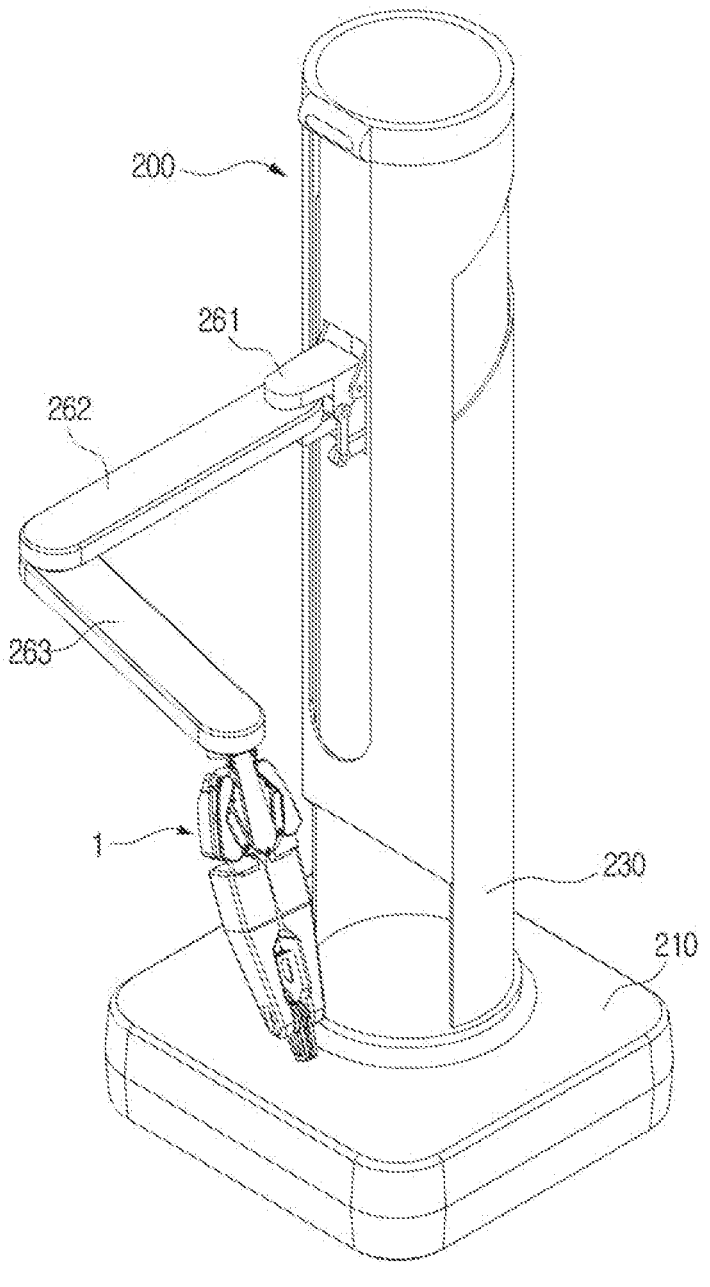
FIG. 18 is a diagram illustrating a service robot which includes a robot hand according to one or more embodiments.

The processor 5 may determine whether a change in orientation of the object is needed when seating the object in the target position by the robot hand 1 (1707 of FIG. 17), and rotate the first gripper 60 and the second gripper 70 at a predetermined angle by controlling the second driving motor 41 and the third driving motor 51 (1708 in FIG. 18). If the change in orientation of the object is not needed, step 1708 in FIG. 17 may be omitted.

The processor 5 may control the fourth driving motor which drives the stricture (e.g., robot arm) to which the robot hand 1 is mounted and seat the object in the target position after moving the robot hand 1 to the target position (1709 in FIG. 17).

In this case, the processor may repeat steps 1706, 1707, 1708, and 1709 in FIG. 17 according to whether the object is seated in the target position (1710 in FIG. 17), or end the work. The processor 5 may control the camera 3 and capture the object being seated in the target position, and determine whether the object is seated based on the captured image.

According to one or more embodiments, the service robot may be implemented as a selective compliance assembly robot arm (SCARA) robot. An example of the robot hand being applied to the SCARA robot will be described below with reference to the drawing.

The SCARA robot may include a plurality of arms which respectively have turning radiuses and are hinge connected, and various tools may be mounted to the arm positioned at a tip end from among the plurality of arms. Here, the various tools may be the robot hand described in the disclosure or a transport device driven in a Z-axis direction.

Figure 19:
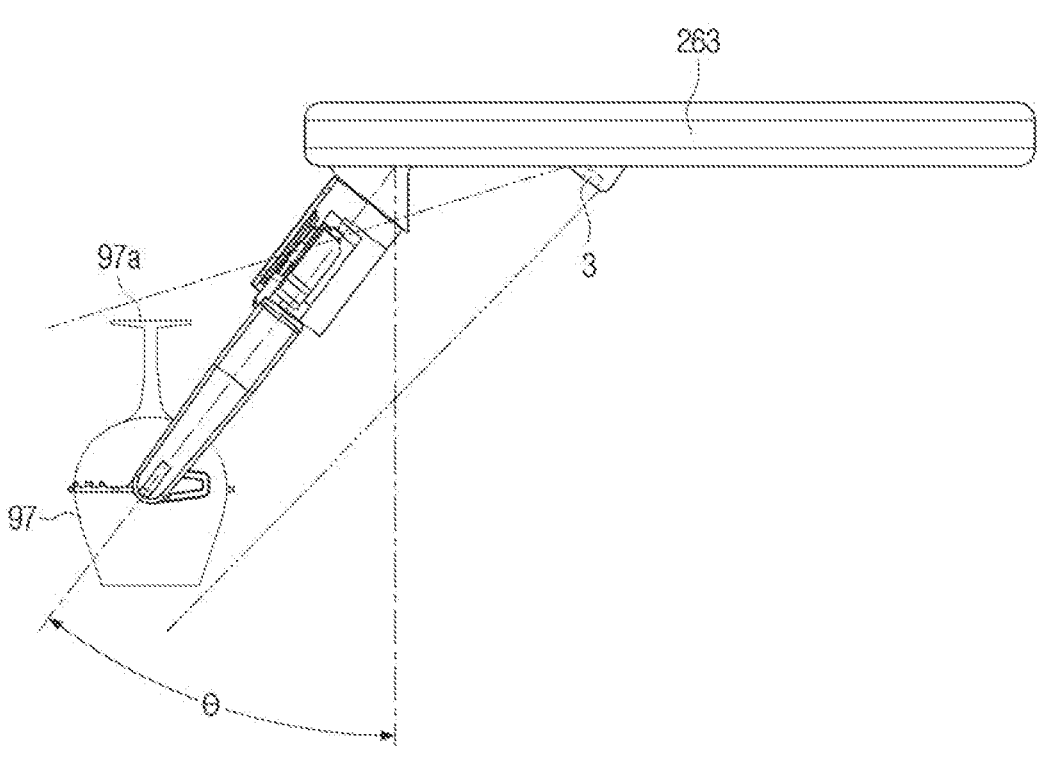
FIG. 19 is a side view illustrating an example of a robot hand coupled to an arm of a service robot which includes a robot hand according to one or more embodiments.

FIG. 18 is a diagram illustrating a SCARA robot according to one or more embodiments. FIG. 19 is a side view illustrating an example of a robot hand coupled to an arm of a SCARA robot according to one or more embodiments.

Referring to FIG. 18, a SCARA robot 200 according to one or more embodiments may include a base 210 provided with a plurality of driving wheels and a wheel driving motor for driving the plurality of driving wheels, a stand 230 having a predetermined height at an upper side of the base 210 and disposed perpendicularly, a connecting member 261 disposed to be elevatable at the stand 230, a first arm 262 with one end rotatably connected to the connecting member 261 and approximately horizontally disposed with respect to the stand 230, a second arm 263 with one end rotatably connected to an opposite end of the first arm 262 and disposed to be parallel with the first arm 262, and the robot hand 1 connected to an opposite end of the second arm 263.

The SCARA robot 200 may be provided with the interface 4 (referring to FIG. 15) and the processor 5 (referring to FIG. 15), and the memory 7 (referring to FIG. 15) at the base 210 or the stand 230. In addition, the SCARA robot 200 may include the camera 3 (referring to FIG. 19) provided at the second arm 263 and configured to capture an object 97 or capture the target position to seat the object 97.

The robot hand 1 may be configured such that a back end of the robot hand 1 is mounted to a bottom surface of the opposite end of the second arm 263. In this case, the robot hand 1 may be disposed to be inclined at a predetermined angle θ with respect to a straight line perpendicular to a horizontal direction of the second arm 263 for a lower end to be protruded from the second arm 263.

As described above, based on disposing the robot hand 1 at the second arm 263 at a predetermined angle θ, the object interfering with the robot hand 1 may be avoided when the robot hand 1 rotates the object while in a state of grasping the object 97. For example, if the robot hand 1 grasps the object 97 while a pedestal 97a of the object 97 is disposed toward a lower side, the object 97 may be changed in orientation to a direction the pedestal 97a of the object 97 faces to an upper side as shown in FIG. 19 when the first gripper 60 and the second gripper 70 of the robot hand 1 are rotated 180 degrees in a clockwise direction. In this case, even if a length of the pedestal 97a of the object 97 is longer than a length of the robot hand 1, the pedestal 97a of the object 97 may not be interfered by the robot hand 1 when changing the orientation of the object 97.

The SCARA robot 200 according to one or more embodiments may apply a degree of freedom to a front end part of the robot hand 1 because of the first gripper 60 and the second gripper 70 included in the robot hand 1. Accordingly, the SCARA robot 200 mounted with the robot hand 1 may be high-priced and may perform most of the works performed by robots of the related art (e.g., a robot mounted with a robot hand of the related art to a multi-jointed arm with multi-degree of freedom having a complex structure).

The robot hand 1 according to one or more embodiments may be provided with the first gripper 60 and the second gripper 70 which have an independent degree of rotational freedom at the ends. Accordingly, if the SCARA robot, an orthogonal robot, or the like is applied to a device provided with a robot arm having a low degree of freedom, various operations of grasping, transporting, seating, and the like of objects of various shapes such as dishware may be possible in narrow spaces.

The service robot according to one or more embodiments may stably perform a grasping motion due to being able to recognize various shapes of objects and being able to grasp the object in the grasping orientation corresponding to the shape of the relevant object from among the plurality of grasping orientations.

While aspects of the refrigerator has been described based on specific shapes and directions with reference to the accompanied drawings above, it will be understood that various changes in form and details may be made therein by those of ordinary skill in the art, and the changes in form and details are to be understood as included in the true spirit and full scope of the disclosure.

What is claimed is:

1. A method of controlling a robot hand comprising a first gripper and a second gripper, the method comprising:
   recognizing a shape of an object through a camera;
   changing, based on the recognized shape of the object, a grasping orientation of at least one of the first gripper and the second gripper;
   grasping the object using the first gripper and the second gripper; and
   rotating the first gripper and the second gripper to change an orientation of the object according to a target position for the object to be seated,
   wherein the first gripper comprises:
      a first grasping part;
      a second grasping part; and
      a third grasping part between the first grasping part and the second grasping part, and
   wherein the second gripper comprises:
      a fourth grasping part facing the first gripper;

a fifth grasping part; and
a sixth grasping part between the fourth grasping part and the fifth grasping part.

2. The method of claim 1, wherein the grasping the object comprises:
   grasping the object by moving the first gripper and the second gripper closer together from a spaced apart state; or
   grasping the object by rotating the first gripper and the second gripper in opposite directions from one another while the first gripper and the second gripper are in a contacted state.

3. The method of claim 2, wherein a first grasping orientation comprises the first gripper and the second gripper being arranged in parallel.

4. The method of claim 1, wherein the changing the grasping orientation further comprises arranging the first gripper and the second gripper into a first grasping orientation or a second grasping orientation,
   wherein the arranging the first gripper and the second gripper into the first grasping orientation comprises causing the first gripper and the second gripper to be in parallel with one another, and causing a first grasping part of the first gripper and the fourth grasping part of the second gripper to face one another, and
   wherein the arranging the first gripper and the second gripper into the second grasping orientation comprises causing the first gripper and the second gripper to be in parallel with one another, and causing the first grasping part and the fourth grasping part to be oriented in opposite directions.

5. The method of claim 4, wherein the changing the grasping orientation further comprises arranging the first gripper and the second gripper into the first grasping orientation, the second grasping orientation, or a third grasping orientation, and
   wherein the arranging the first gripper and the second gripper into the third grasping orientation comprises causing the first gripper and the second gripper to move toward one another until the first gripper comes into contact with the second gripper, and rotating the first gripper and the second gripper using a scissoring motion.

6. The method of claim 1, wherein the grasping the object comprises the first gripper and the second gripper being moved in parallel with each other toward the object.

7. The method of claim 1, wherein the rotating the first gripper and the second gripper to change the orientation of the object comprises:
   identifying rotation angles of the first gripper and the second gripper according to the target position to seat the object; and
   rotating the first gripper and the second gripper in a same direction at the identified rotation angles.

8. A robot hand comprising:
   a supporting part;
   a first linking part and a second linking part expandably connected, respectively, at opposite sides of the supporting part;
   a first finger part comprising a first back end which is connected to the first linking part;
   a second finger part comprising a second back end which is connected to the second linking part, wherein the second finger part is parallel to the first finger part;
   a first gripper rotatably connected to a first front end of the first finger part;

a second gripper rotatably connected to a second front end of the second finger part and facing the first gripper;

a first driver configured to expandably drive the first linking part and the second linking part;

a second driver configured to drive the first gripper to rotate; and a third driver configured to drive the second gripper to rotate, wherein the first gripper comprises:

a first grasping part;

a second grasping part; and a third grasping part between the first grasping part and the second grasping part, and wherein the second gripper comprises:

a fourth grasping part facing the first gripper;

a fifth grasping part; and a sixth grasping part between the fourth grasping part and the fifth grasping part.

9. The robot hand of claim 8, wherein the first finger part and the second finger part are configured to remain parallel while moving closer to one another in a first direction and moving apart from one another in a second direction.

10. The robot hand of claim 9, further comprising:

a locking part comprising a locking pin, wherein the locking part is configured to lock the first finger part and the second finger part while the first gripper and the second gripper are in a contacted state.

11. The robot hand of claim 10, wherein the locking part further comprises:

an operation button provided at the first finger part and facing the second finger part;

a groove member on the second finger part and configured to receive the locking pin; and a hydraulic line between the operation button and the locking pin, and wherein the locking pin is configured to protrude from the first finger part based on the operation button being pressed.

12. The robot hand of claim 8, wherein the second grasping part and the fifth grasping part are configured to face each other when the first gripper and the second gripper are in a contacted state and are rotated in opposite directions from each other.

13. The robot hand of claim 9, further comprising:

a synchronizer configured to maintain the first finger part and the second finger part in parallel by linking an expansion driving of the first linking part and the second linking part.

14. The robot hand of claim 13, wherein the synchronizer comprises:

a first gear chain connecting the first linking part and the first finger part at a 1:2 deceleration ratio; and a second gear chain connecting the second linking part and the second finger part at a 1:2 deceleration ratio.

15. A service robot comprising:

a base;

a stand connected to and disposed vertically to the base;

a first arm connected to the stand;

a second arm rotatably connected to the first arm;

a robot hand connected to the second arm and comprising a first gripper and a second gripper; and at least one processor configured to:

recognize a shape of an object based on an image of the object, and control the robot hand to grasp the object by changing a grasping orientation of the first gripper and the second gripper according to a recognition result, wherein the first gripper comprises:

a first grasping part;

a second grasping part; and a third grasping part between the first grasping part and the second grasping part, and wherein the second gripper comprises:

a fourth grasping part facing the first gripper;

a fifth grasping part; and a sixth grasping part between the fourth grasping part and the fifth grasping part.

16. The service robot of claim 15, wherein the robot hand is inclined toward an outer side of the second arm with respect to a straight line which is perpendicular to a horizontal direction of the second arm, and wherein the robot hand further comprises:

a supporting part;

a first linking part and a second linking part expandably connected, respectively, at opposite sides of the supporting part;

a first finger part comprising a first back end which is connected to the first linking part;

a second finger part comprising a second back end which is connected to the second linking part, wherein the second finger part is parallel to the first finger part;

a first driver configured to expandably drive the first linking part and the second linking part;

a second driver configured to drive the first gripper to rotate; and a third driver configured to drive the second gripper to rotate, wherein the first gripper is rotatably connected to a first front end of the first finger part, and wherein the second gripper is rotatably connected to a second front end of the second finger part and faces the first gripper.

17. The service robot of claim 16, wherein the robot hand further comprises:

a locking part comprising a locking pin, the locking part configured to lock the first finger part and the second finger part together while the first gripper and the second gripper are in a contacted state.

18. The service robot of claim 17, wherein the locking part further comprises:

an operation button on the first finger part and facing the second finger part;

a groove member on the second finger part and configured to receive the locking pin; and a hydraulic line between the operation button and the locking pin, and wherein the locking pin is configured to protrude from the first finger part based on the operation button being pressed.

* * * * *